US008392932B2

(12) United States Patent
Kawamoto

(10) Patent No.: US 8,392,932 B2
(45) Date of Patent: Mar. 5, 2013

(54) INFORMATION PROCESSING DEVICE FOR CAUSING A PROCESSOR TO CONTEXT SWITCH BETWEEN THREADS INCLUDING STORING CONTEXTS BASED ON NEXT THREAD START POSITION

(75) Inventor: Takuji Kawamoto, Aichi (JP)

(73) Assignee: Panasonic Corporation, Osaka (JP)

( * ) Notice: Subject to any disclaimer, the term of this patent is extended or adjusted under 35 U.S.C. 154(b) by 218 days.

(21) Appl. No.: 12/991,980

(22) PCT Filed: May 13, 2009

(86) PCT No.: PCT/JP2009/002080
§ 371 (c)(1),
(2), (4) Date: Nov. 10, 2010

(87) PCT Pub. No.: WO2009/157127
PCT Pub. Date: Dec. 30, 2009

(65) Prior Publication Data

US 2011/0067034 A1 Mar. 17, 2011

(30) Foreign Application Priority Data

Jun. 25, 2008 (JP) ................................ 2008-165443

(51) Int. Cl.
*G06F 9/46* (2006.01)
*G06F 7/38* (2006.01)
*G06F 9/00* (2006.01)
*G06F 9/44* (2006.01)

(52) U.S. Cl. ......... 718/108; 718/102; 712/220; 712/228

(58) Field of Classification Search ........................ None
See application file for complete search history.

(56) References Cited

U.S. PATENT DOCUMENTS 6,910,213 B1 6/2005 Hirono et al.
(Continued)

FOREIGN PATENT DOCUMENTS

JP 7-141209 6/1995
JP 7-191863 7/1995
(Continued)

OTHER PUBLICATIONS

International Search Report issued Jun. 16, 2009 in International (PCT) Application No. PCT/JP2009/002080.

*Primary Examiner* — Meng An
*Assistant Examiner* — Bradley Teets
(74) *Attorney, Agent, or Firm* — Wenderoth, Lind & Ponack, L.L.P.

(57) ABSTRACT

An information processing device for causing a processor to execute a plurality of threads by switching between them. Each thread performs a process in correspondence with an obtainment of an event. The information processing device, when causing a second thread to transit from a non-execution state to an execution state to replace a first thread, detects whether or not, in the first thread having transited to the non-execution state, a next start position of a process belongs to an already processed part, detects whether or not a start position of a process in the second thread in the execution state belongs to the processed part; and determines whether or not to set a context for execution of the second thread into the processor in accordance with detection results of the first and second detection units, and performs processing in accordance with the determination.

6 Claims, 22 Drawing Sheets

U.S. PATENT DOCUMENTS

| | | | | |
|---|---|---|---|---|
| 7,234,139 | B1 | 6/2007 | Feinberg | |
| 7,925,869 | B2 * | 4/2011 | Kelsey et al. | 712/220 |
| 8,001,549 | B2 * | 8/2011 | Henmi | 718/108 |
| 2005/0172103 | A1 * | 8/2005 | Inuo et al. | 712/10 |
| 2005/0223352 | A1 | 10/2005 | Nishida | |
| 2007/0028240 | A1 * | 2/2007 | Hayakawa | 718/100 |
| 2007/0113055 | A1 * | 5/2007 | Dale et al. | 712/228 |

FOREIGN PATENT DOCUMENTS

| | | |
|---|---|---|
| JP | 11-212808 | 8/1999 |
| JP | 2004-522234 | 7/2004 |
| JP | 2005-284904 | 10/2005 |
| JP | 2007-207074 | 8/2007 |
| JP | 2008-102847 | 5/2008 |

* cited by examiner

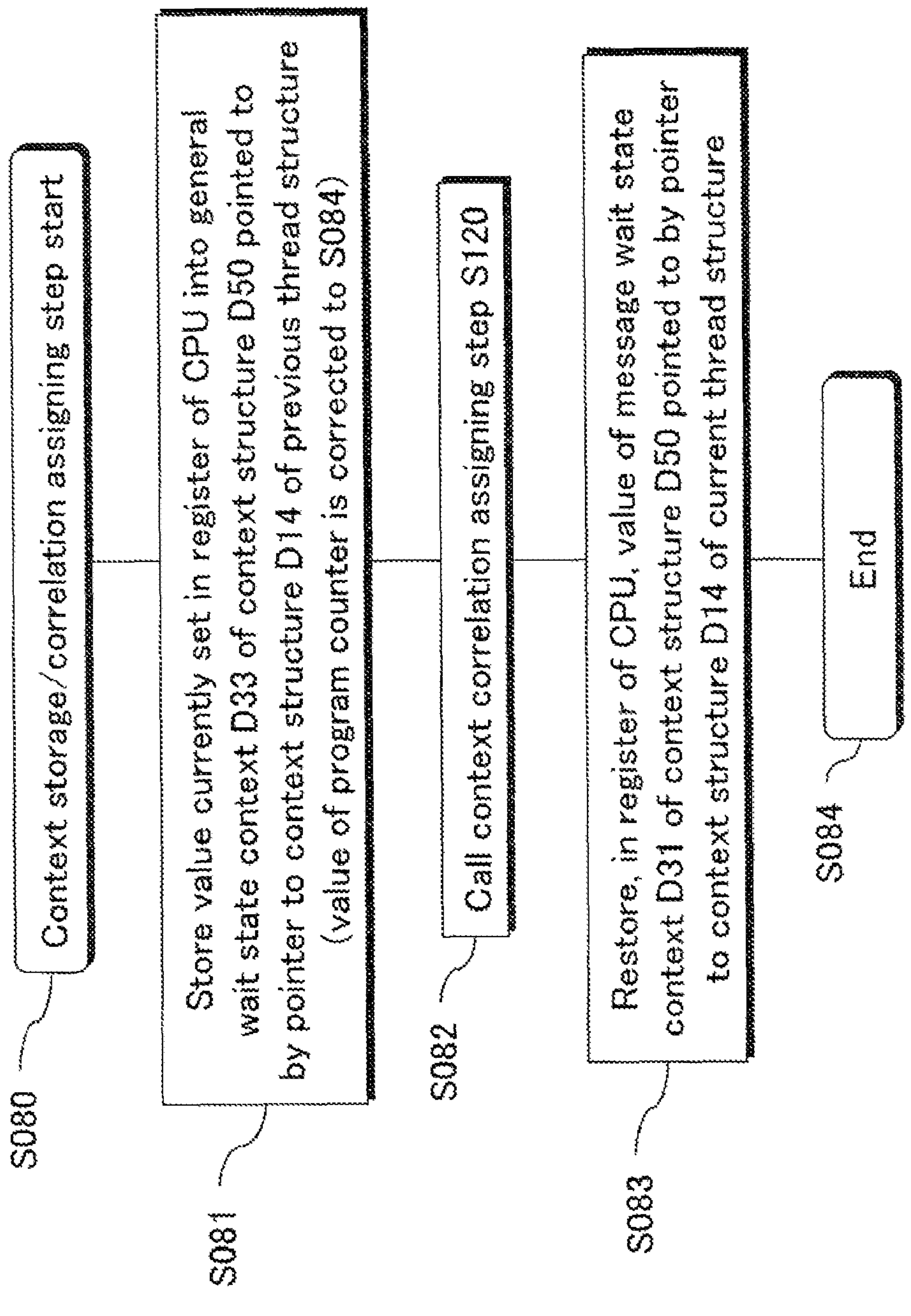

FIG.21

S080 Context storage/correlation assigning step start

S081 Store value currently set in register of CPU into general wait state context D33 of context structure D50 pointed to by pointer to context structure D14 of previous thread structure (value of program counter is corrected to S084)

S082 Call context correlation assigning step S120

S083 Restore, in register of CPU, value of message wait state context D31 of context structure D50 pointed to by pointer to context structure D14 of current thread structure S084 End

INFORMATION PROCESSING DEVICE FOR CAUSING A PROCESSOR TO CONTEXT SWITCH BETWEEN THREADS INCLUDING STORING CONTEXTS BASED ON NEXT THREAD START POSITION

TECHNICAL FIELD

The present invention relates to a multi-thread execution control technology.

BACKGROUND ART

There is known an execution control technology called multi-thread in which one processor executes a plurality of processes by switching them, executing them in parallel in appearance. The multi-thread may also be called a multi-task, a multi-process and so on.

In the multi-thread control, when a cause for switching the thread occurs, the following process is performed in general: a context of the thread which has been executed so far is saved in the memory, namely a register value of the processor is saved in the memory; and a context of the thread to be executed next, which has been saved in the memory, is restored (hereinafter the process is referred to as "context save/set process").

With this process, when an execution of a thread is stopped due to switching between threads, the execution can be restarted from a point at which the execution was stopped.

In this way, when threads are switched in the multi-thread control, generally the context save/set process is performed. However, one problem of this process is that it takes time to transfer data between processor and memory for writing and reading of contexts, increasing the time required for switching between threads, thus decreasing the program processing efficiency.

There are various known methods conceived to perform the switching between threads efficiently. For example, Patent literature 1 attempts to reduce the time required for switching between threads by saving and restoring data (contexts) of sizes that correspond to the sizes of registers used by programs (threads) when the processor executes a plurality of programs (threads), which use registers of different sizes, in parallel by switching them.

[Citation List]

[Patent Literature]

[Patent Literature 1]

Japanese Patent Application Publication No. 2007-207074

SUMMARY OF INVENTION

Technical Problem

However, the method disclosed in Patent Literature 1 can merely reduce the time required for reading/writing of the data that is not needed to execute each thread. Thus the problem of reducing the time required for switching between the threads still remains to be solved.

It is accordingly an object of the present invention to provide an information processing device, an information processing method, and an information processing program which can switch between threads at higher speeds than conventional ones by a method different from conventional ones.

Solution to Problem

One aspect of the present invention for solving the above problem provides an information processing device for causing a processor to execute a plurality of threads by switching therebetween, each of the threads performing a process in correspondence with an obtainment of an event, the information processing device comprising: a scheduling unit operable to cause a first thread to transit from an execution state to a non-execution state, select a second thread to be executed next from among the plurality of threads, and cause the second thread to transit to the execution state; a first detection unit operable to detect whether or not, in the first thread having transited to the non-execution state, a next start position, from which a process should start when the first thread transits to the execution state next, belongs to a processed part corresponding to an obtainment of an event; a second detection unit operable to detect whether or not a start position of a process in the second thread that has transited to the execution state belongs to the processed part; and a setting unit operable to, when the second thread is caused to transit to the execution state, determine whether or not to set a context for execution of the second thread into the processor in accordance with detection results of the first detection unit and the second detection unit, and perform processing in accordance with the determination.

Another aspect of the present invention for solving the above problem provides an information processing method for use in an information processing device for causing a processor to execute a plurality of threads by switching therebetween, each of the threads performing a process in correspondence with an obtainment of an event, the information processing method comprising: a step in which a scheduling unit causes a first thread to transit from an execution state to a non-execution state, select a second thread to be executed next from among the plurality of threads, and cause the second thread to transit to the execution state; a step in which a first detection unit detects whether or not, in the first thread having transited to the non-execution state, a next start position, from which a process should start when the first thread transits to the execution state next, belongs to a processed part which has already been processed in correspondence with an obtainment of an event; a step in which a second detection unit operable to detect whether or not a start position of a process in the second thread that has transited to the execution state belongs to the processed part; and a step in which a setting unit, when the second thread is caused to transit to the execution state, determines whether or not to set a context for execution of the second thread into the processor in accordance with detection results of the first detection unit and the second detection unit, and performs processing in accordance with the determination.

Still another aspect of the present invention for solving the above problem provides an information processing program for causing an information processing device, which causes a processor to execute a plurality of threads by switching therebetween, to execute a thread execution control process, each of the threads performing a process in correspondence with an obtainment of an event, the thread execution control process comprising the steps of: causing a first thread to transit from an execution state to a non-execution state, selecting a second thread to be executed next from among the plurality of threads, and causing the second thread to transit to the execution state; detecting whether or not, in the first thread having transited to the non-execution state, a next start position, from which a process should start when the first thread transits to the execution state next, belongs to a processed part which has already been processed in correspondence with an obtainment of an event; detecting whether or not a start position of a process in the second thread that has transited to the execution state belongs to the processed part; and determining, when the second thread is caused to transit to the execution state, whether or not to set a context for execution of the second thread into the processor in accordance with detection results of the first detection unit and the second detection unit, and performing processing in accordance with the determination.

Advantageous Effects of Invention

The information processing device of the present invention with the above construction, when the thread in the execution state transits from the first thread to the second thread, determines whether or not to set a context for execution of the second thread into the processor in accordance with detection results of the first detection unit and the second detection unit. This increases the speed at which the switching between threads is performed, compared with the conventional case where the context is always set into the processor.

The above information processing device may further comprise: a context storage unit storing contexts in correlation with threads; and a context correlation unit operable to store a context set in the processor into the context storage unit as a context correlated with the first thread when the first detection unit detects that the next start position does not belong to the processed part, wherein the setting unit does not set a context correlated with the second thread into the processor when the first detection unit detects that the next start position belongs to the processed part and the second detection unit detects that the start position belongs to the processed part, and sets the context correlated with the second thread into the processor when the second detection unit does not detect that the start position belongs to the processed part.

It should be noted here that the term "correlation" refers to information which correlates a thread with a context stored in the context storage unit.

With the above construction, when the second thread is caused to transit to the execution state, the setting unit does not set a context correlated with the second thread into the processor when the first detection unit detects that the next start position belongs to the processed part and the second detection unit detects that the start position belongs to the processed part. Accordingly, the information processing device of the present invention can switch between threads at a further higher speed.

Furthermore, when both the first detection unit and the second detection unit result in detections, both the start position of the process in the second thread in the execution state and the next start position, from which the process should start when the first thread transits to the execution state next, belong to the processed part. Accordingly, the device operates normally even if the second thread is executed while a context correlated with the second thread is not set in the processor.

In the above information processing device, when the first detection unit detects that the next start position belongs to the processed part, the context correlation unit may further delete, from the context storage unit, a correlation between the context correlated with the first thread and the first thread.

With the above construction, when the first detection unit detects that the next start position belongs to the processed part, the context correlation unit deletes a correlation between the first thread and the correlated context. This makes it possible to reduce the number of contexts to be managed and reduce the memory capacity required to store the contexts as a whole.

The above information processing device may further comprise: an initial context storage unit storing an initial context which specifies, as a start position of a process, the processed part for a thread not correlated with a context in the context storage unit, wherein the second detection unit detects that the start position of the process in the second thread belongs to the processed part when the second thread is not correlated with a context in the context storage unit, the context correlation unit, when the second detection unit detects that the start position belongs to the processed part and the first detection unit detects that the next start position belongs to the processed part, changes a partner of correlation of the context correlated with the first thread from the first thread to the second thread, and when the second detection unit detects that the start position belongs to the processed part and the first detection unit does not detect that the next start position belongs to the processed part, the context correlation unit stores the initial context into the context storage unit as a context correlated with the second thread, and the setting unit, when the first detection unit does not detect that the next start position belongs to the processed part and when the second detection unit detects that the start position belongs to the processed part, sets the initial context, which has been stored in the context storage unit in correlation with the second thread by the context correlation unit, into the processor.

With the above construction, when the second detection unit detects that the start position belongs to the processed part, that is say, when a context is not correlated with the second thread, and then the first detection unit detects that the next start position belongs to the processed part, the context having been correlated with the first thread is correlated with the second thread. Accordingly, when a context needs to be saved into the memory when the second thread transits to the non-execution state after the execution thereof, the area for storing the context has already been allocated in the memory.

Also, in the state where the second thread is not correlated with a context, when the first detection unit does not detect that the next start position belongs to the processed part, an initial context, which specifies, as a start position of a process, the processed part for a thread not correlated with a context in the context storage unit, is correlated with the second thread, and the setting unit sets the initial context into the processor. This makes it possible to execute the second thread normally.

The above information processing device may further comprise: a context correlation unit operable to, when the first detection unit detects that the next start position belongs to the processed part and the second detection unit detects that the start position belongs to the processed part, change partners of correlation of the contexts correlated with the second thread and the first thread, from the second thread to the first thread, and from the first thread to the second thread, respectively.

With the above construction, when the first detection unit detects that the next start position belongs to the processed part and the second detection unit detects that the start position belongs to the processed part, both the start position of the process in the second thread that has transited to the execution state and the next start position, from which the process should start when the first thread transits to the execution state, belong to the processed part. Accordingly, the context correlation unit changes from the second thread to the first thread in a correlation with the context. This makes it possible to hold the context of the first thread properly without saving the context having been set in the processor.

Furthermore, the context correlation unit changes from the first thread to the second thread in a correlation with the context. Accordingly, when a context needs to be saved into the memory when the second thread transits to the non-execution state after the execution thereof, the area for storing the context has already been allocated in the memory.

Also, when, at a later time, the first thread transits to the execution state, the context correlated with the first thread can be set into the processor as it is.

In the above information processing device, the event may be a message, the non-execution state includes a message wait state in which reception of a message is waited for, the plurality of threads include a thread in which a flag is set to indicate that the thread transits to the message wait state when the next start position belongs to the processed part, and the first detection unit and the second detection unit detect whether or not a start position of a process in detection-target thread belongs to the processed part which, by detecting whether or not the flag is set in the detection-target thread.

With the above structure, each thread is constructed such that a flag is set to indicate that the thread transits to the message wait state when the next start position belongs to the processed part. This makes it possible for the information processing device of the present invention to produce an advantageous effect that it can switch between threads at a further higher speed.

BRIEF DESCRIPTION OF DRAWINGS

FIG. 21 is a flowchart showing the operation of the context storage/correlation assigning unit 2033 provided in the information processing device 2000.

DESCRIPTION OF EMBODIMENTS

Figure 1:
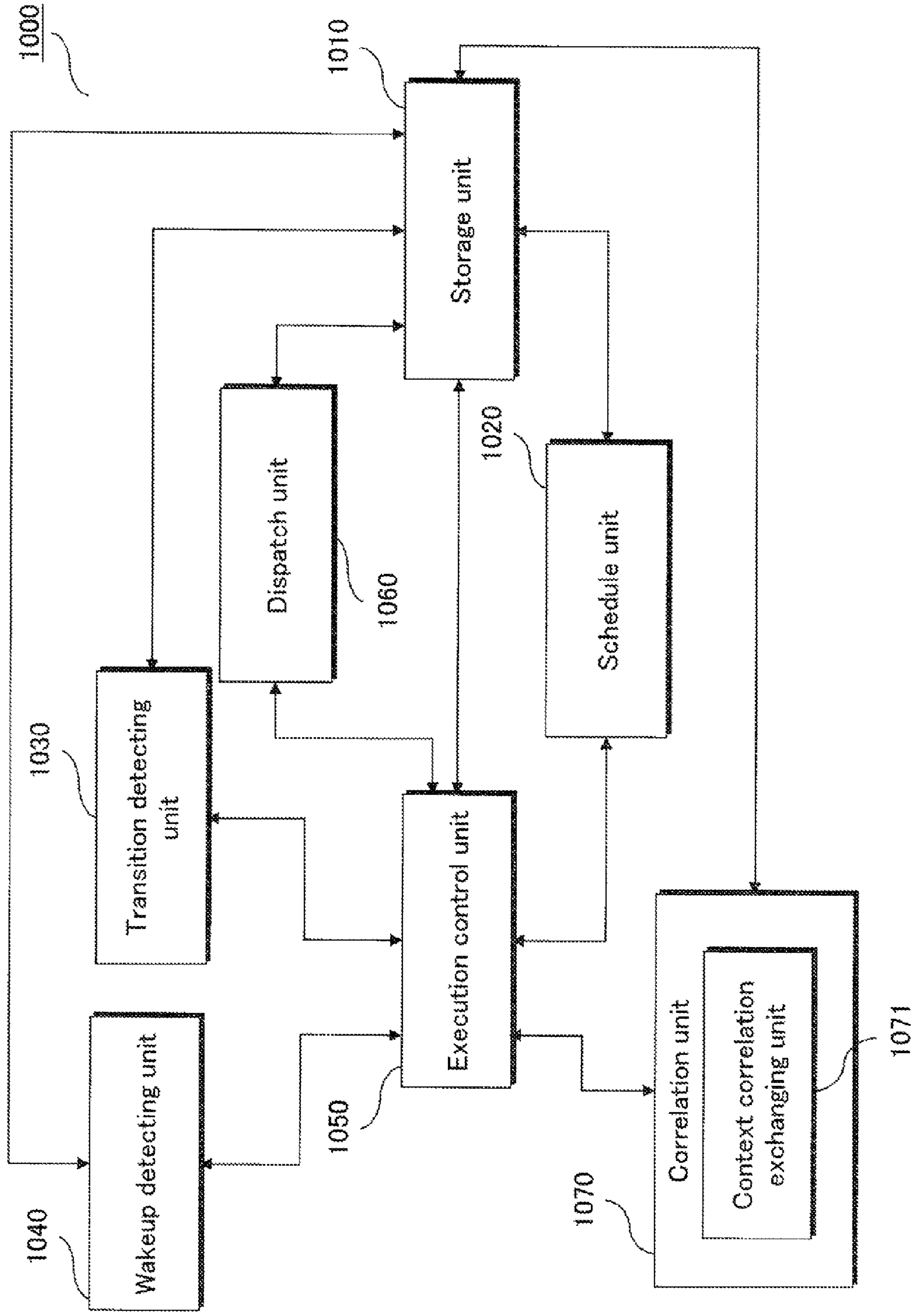
FIG. 1 is functional block diagram showing an information processing device 1000 in Embodiment 1 of the present invention.

Embodiments of the present invention are described below with reference to the drawings.

<<Embodiment 1>>

<Outline>

The information processing device in Embodiment 1 is an improvement of a conventional information processing device that realizes functions of a multi-thread OS (Operating System) by causing a processor such as a CPU (Central Processing Unit) to execute programs.

The following description assumes, as one example, a case where the threads being the target of the multi-thread control include a plurality of threads which operate as so-called event-driven-type processing programs, and occurrences of various events are conveyed by messages.

The messages include, for example, a notification indicating that a mouse button was clicked by the user, and a notification which is used to cause threads to cooperate with each other. Also, the causes of switching between threads include, for example, a case where time slices have completely been used, a case where assignment of a shared resource is being waited for, and a case where reception of one of the afore-said messages is waited for. Note that in the following description, when switching from one thread to another is performed, said one thread is referred to as "previous thread" and said another thread as "current thread".

Each of the event-driven-type threads, while it is in the execution state, repeatedly executes a loop process called "message loop". The message loop is formed so that a judgment process of judging whether or not a message has been received by the message queue is included in a main routine of a program, and in the message loop, when a message has been received, the thread calls a predetermined subroutine and performs a process according to the message, and then performs the judgment again, and when a message has not been received, the thread performs a process of setting a flag to indicate a transition to a state of waiting a message (hereinafter referred to as "message wait state"), and causes the OS to perform switching between threads.

When the OS performs the process of switching between threads while the flag is set, the thread (previous thread) that has set the flag transits to the message wait state and stops the execution of the message loop, and another thread (current thread) transits to the execution state and the current thread executes the message loop. When the previous thread in the message wait state transits to the execution state next, the execution is restarted from the judgment process.

Note that switching between threads may occur even in the process performed by the subroutine, and in that case, the previous thread transits to a state different from the message wait state (an executable state or a general wait state which will be described later).

In this way, each of the event-driven-type threads executes the message loop. Accordingly, if, when the previous thread transits to the message wait state, the current thread has transited to the message wait state (current state) from the execution state (previous state) immediately before a transition to the non-execution state, then when the previous thread transits to the execution state next, it restarts the execution from the afore-mentioned judgment process, and the current thread is to restart the execution from the afore-mentioned judgment process, as well.

That is to say, the content of data indicated by the value set in the register of the CPU (context of the previous thread) matches the content of data indicated by the context of the current thread. This means that the process of the current thread can be restarted without performing the process of saving/setting the context.

In view of this, when, during the process of switching between threads, the information processing device detects that the previous thread is to transit to the message wait state and detects that the current thread has transited to the message wait state (current state) from the execution state (previous state), the information processing device does not perform the process of saving/setting the context, thereby performing the switching between threads at a high speed and realizing an efficient process.

<Construction>

FIG. 1 is functional block diagram showing an information processing device 1000 in Embodiment 1 of the present invention.

The information processing device 1000 includes, as a circuit structure, a CPU and a Memory (not illustrated), and includes in the functional aspect, as shown in FIG. 1, a storage unit 1010, a schedule unit 1020, a transition detecting unit 1030, a wakeup detecting unit 1040, an execution control unit 1050, a dispatch unit 1060, and a correlation unit 1070.

Here, the storage unit 1010 is realized by a storage medium such as a memory, and has a function to store a group of subroutines constituting the operating system (hereinafter referred to as "step group") and a group of data (a group of structures such as the scheduler structure, thread structures, and context structures). When the CPU executes the step group, the functions of the schedule unit 1020, transition detecting unit 1030, wakeup detecting unit 1040, execution control unit 1050, dispatch unit 1060, and correlation unit 1070 are realized.

Details of contents of the step group and the structure group will be described later. The scheduler structure includes information for identifying the previous thread and the current thread, and each thread structure is information for controlling the execution of each thread, and includes, for example, the state of the thread, priority of execution, and pointer indicating the correlated context. Also, each context structure is information that indicates contents of a context correlated with a thread.

Note that the structure mentioned here refers to the data itself that includes a predetermined data configuration, and the scheduler structure, thread structure, and context structure have different data configurations. Also, the thread structures have the same data configuration, but have different pieces of data. This holds true with the context structures.

The schedule unit 1020 has a function to, in accordance with the instruction by the execution control unit 1050 and based on the state and execution priority of the threads included in the thread structures stored in the storage unit 1010, determine a thread to be executed next and cause the determined thread to transit to the execution state. The schedule unit 1020 causes the scheduler structure in the storage unit 1010 to reflect the information on the determined thread.

The transition detecting unit 1030 has a function to, in accordance with the instruction by the execution control unit 1050, detect a transition of a thread to the message wait state by referring to a thread structure in the storage unit 1010 that is information for controlling the execution of the previous thread (hereinafter the thread structure is referred to as "previous thread structure").

The wakeup detecting unit 1040 has a function to, in accordance with the instruction by the execution control unit 1050, detect that the thread has transited to the message wait state (current state) from the execution state (previous state) by referring to the thread structure in the storage unit 1010 that is information for controlling the execution of the current thread (hereinafter referred to as "current thread structure").

The execution control unit 1050 has a function to control the entire device and instruct each block in the device. In particular, when the schedule unit 1020 determines a thread to be executed next, the execution control 1050 instructs the transition detecting unit 1030 and the wakeup detecting unit 1040 to perform detections, and in accordance with the results of the detections, instructs either of the dispatch unit 1060 and the correlation unit 1070 to perform a process for switching between threads.

The dispatch unit 1060 has a function to, in accordance with the instruction by the execution control unit 1050, store the value set in the register of the CPU into the storage unit 1010 as a context structure of the previous thread, and set the contents of a context structure of the current thread stored in the storage unit 1010 into the register of the CPU.

The correlation unit 1070 includes a context correlation exchanging unit 1071. The context correlation exchanging unit 1071 has a function to, in accordance with the instruction by the execution control unit 1050, exchange the correlation between the previous thread and the context with the correlation between the current thread and the context. More specifically, the context correlation exchanging unit 1071 exchange a pointer pointing to the context correlated with the thread included in the previous thread structure with a pointer pointing to the context correlated with the thread included in the current thread structure.

<Data>

The following will explain about the data used by the information processing device 1000 in the multi-thread control. Note that in the following description, it is assumed that three event-driven-type threads are executed in parallel. Also note that in the following example, it is assumed that one semaphore is used to perform the wait process.

Figure 2:
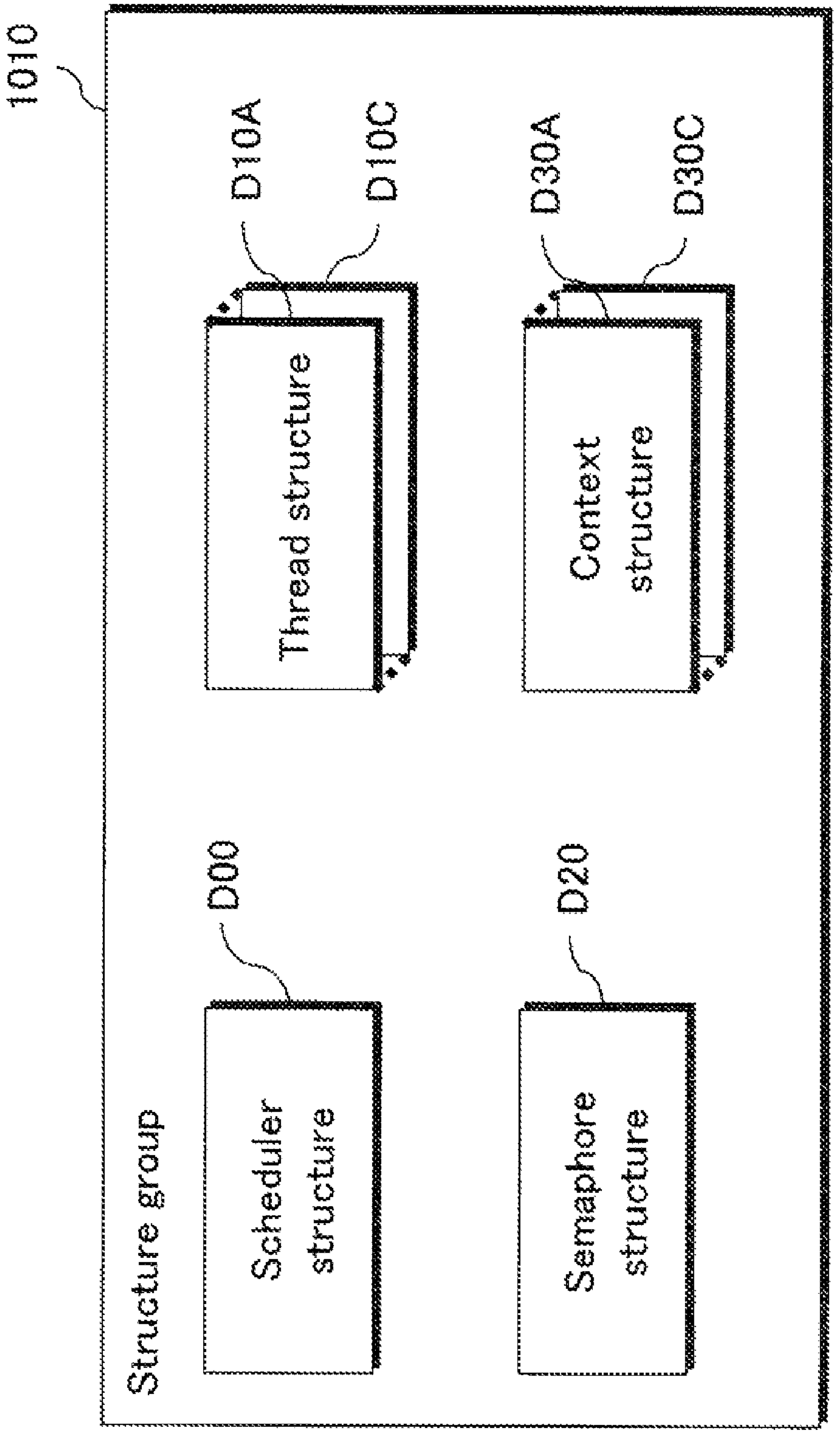
FIG. 2 shows a structure group stored in the storage unit 1010.

FIG. 2 shows a structure group stored in the storage unit 1010.

As shown in FIG. 2, the storage unit 1010 stores a scheduler structure D00, thread structures D10A through D10C, a semaphore structure D20, and context structures D30A through D30C.

<Thread Structure>

First, the thread structures D10A through D10C will be described.

The thread structures D10A through D10C are each information for controlling the execution of one thread, and are each generated when a thread is generated. The thread structures D10A through D10C have the same data configuration, and thus in the following, the thread structure D10A will be described as a representative example.

Figure 4:
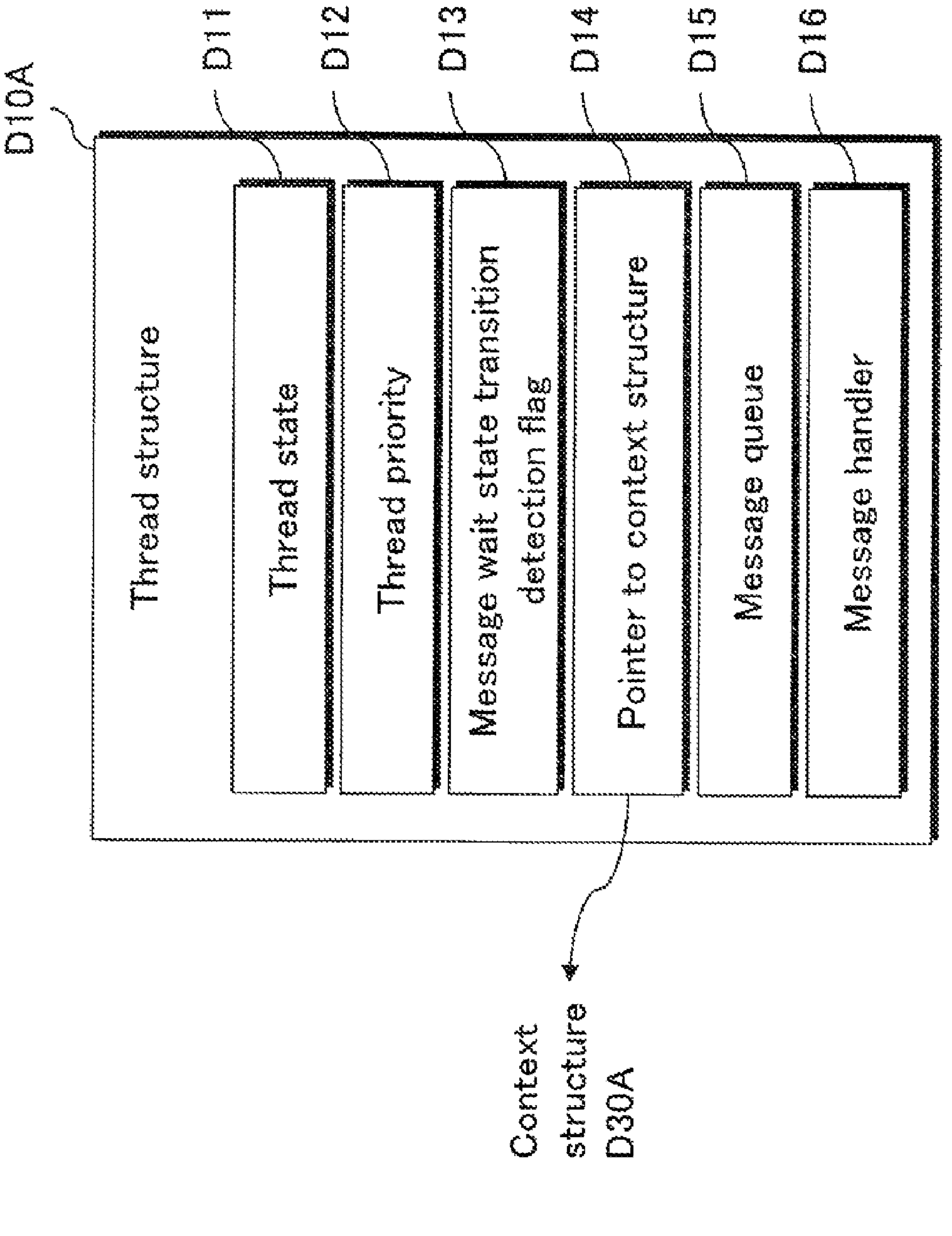
FIG. 4 shows the data configuration of the thread structure D10A.

FIG. 4 shows the data configuration of the thread structure D10A.

As shown in FIG. 4, the thread structure D10A includes a thread state D11, a thread priority D12, a message wait state transition detection flag D13, a pointer to context structure D14, a message queue D15, and a message handler D16.

It should be noted here that the thread state D11 is information showing the state of the thread, and indicates any of the end state T0, execution state T1, executable state T2, general wait state T3, and message wait state T4. How the thread transits to each state will be described later.

The thread priority D12 is information indicating the priority of the execution of the thread. The priority is determined, for example, when a thread is generated, in accordance with a program which generates the thread.

The message wait state transition detection flag D13 is information which indicates whether or not the previous thread is to transit to the message wait state T4, and indicates whether or not the current thread has transited to the message wait state T4. In order to indicate that a thread transit from the execution state T1 to the message wait state T4, the message wait state transition detection flag D13 is set by the thread as "true". When switching between threads occurs, the flag is used to judge whether or not the context save/set process is required.

The pointer to context structure D14 is a pointer for identifying a context structure that is correlated with a thread. The pointer to context structure D14 is set when a context correlated with a thread is generated, and, as will be described later, is updated when switching between threads is performed without performing the context save/set process. The recitation "context structure D30" in FIG. 4 indicates pointing to any of the context structures D30A through D30C.

The message queue D15 is a set of messages received by a thread. The message is added by the OS or other threads. When the message is processed, namely, when a subroutine (message handler) which corresponds to an event (message) is executed, the message queue D15 may become empty.

The message handler D16 is a pointer which is used to store an address in the storage unit 1010 of the subroutine (message handler) that is executed when a message has been received.

Here, a brief explanation will be given of the state transition of the thread by the multi-thread control by the information processing device 1000.

Figure 5:
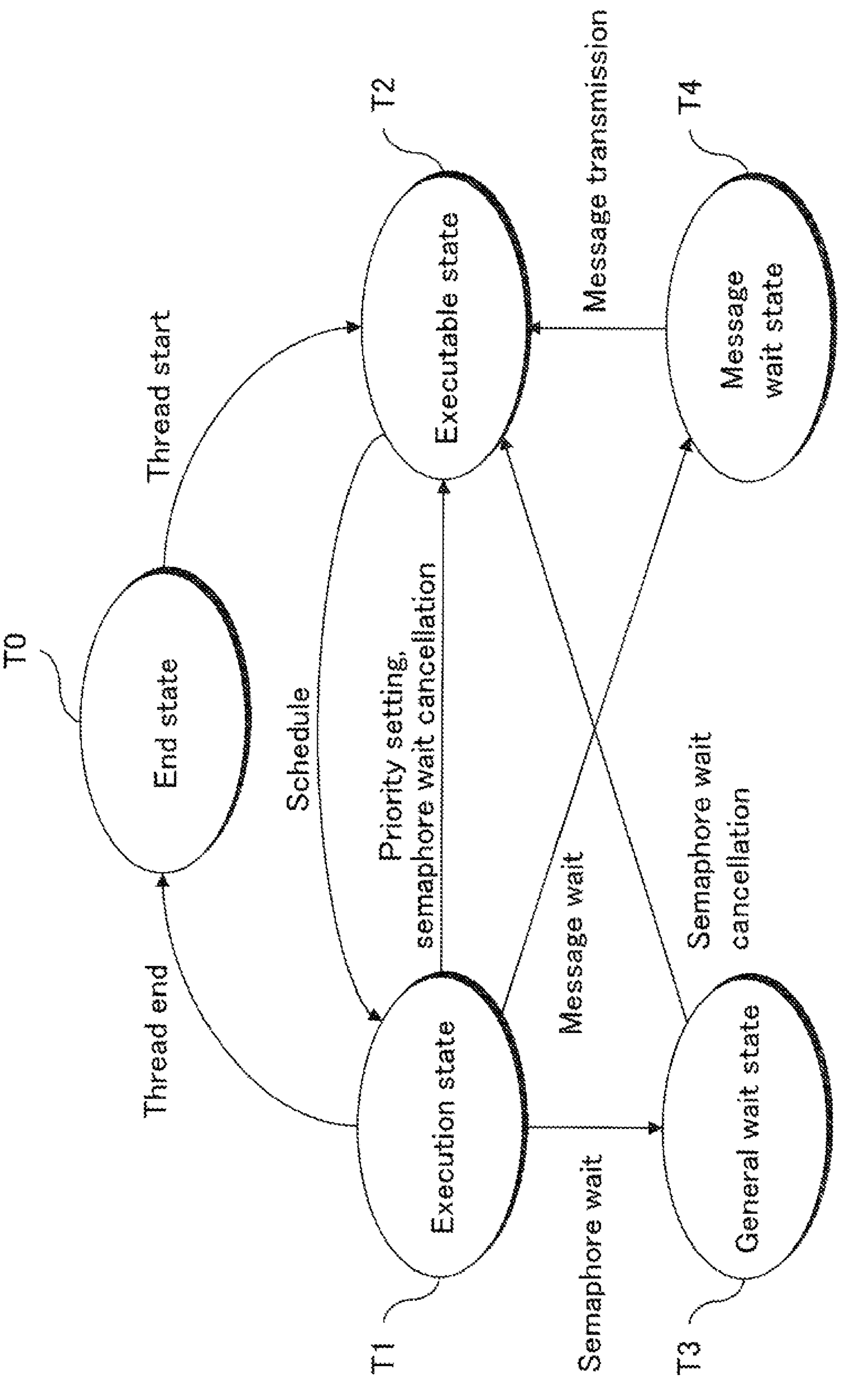
FIG. 5 illustrates the state transition of thread.

FIG. 5 illustrates the state transition of thread.

In FIG. 5, an end state T0 represents a state in which a thread is after the operation of the thread ends. A thread also transits to this state immediately after the thread is generated. After a thread is generated, when the process of starting the thread is performed, the thread transits to an executable state T2.

The executable state T2 is a state which waits for an assignment of a CPU, and when a CPU is assigned to the thread, the thread transits to the execution state T1.

An execution state T1 is a state in which a thread is executed after a CPU is assigned thereto. When, for example, a thread in the execution state T1 becomes lower in priority than another thread in the executable state T2, the thread transits from the execution state T1 to the executable state T2. Also, when, for example, it is necessary to wait for a resource used by another thread to be freed (semaphore wait), the thread transits from the execution state T1 to a general wait state T3. Furthermore, when a message wait occurs, the thread transits from the execution state T1 to a message wait state T4.

The general wait state T3 is a state in which a thread waits for something due to some cause, such as a semaphore wait, other than the cause for the message wait state T4. The thread transits from the general wait state T3 to the executable state T2 when, for example, the semaphore wait is cancelled.

The message wait state T4 is a state in which there is no message in the message queue D15 and reception of a message is waited for. When a message is transmitted (i.e. received), the thread transits from the message wait state T4 to the executable state T2.

<Scheduler Structure>

Next, the scheduler structure D00 will be explained.

Figure 3:
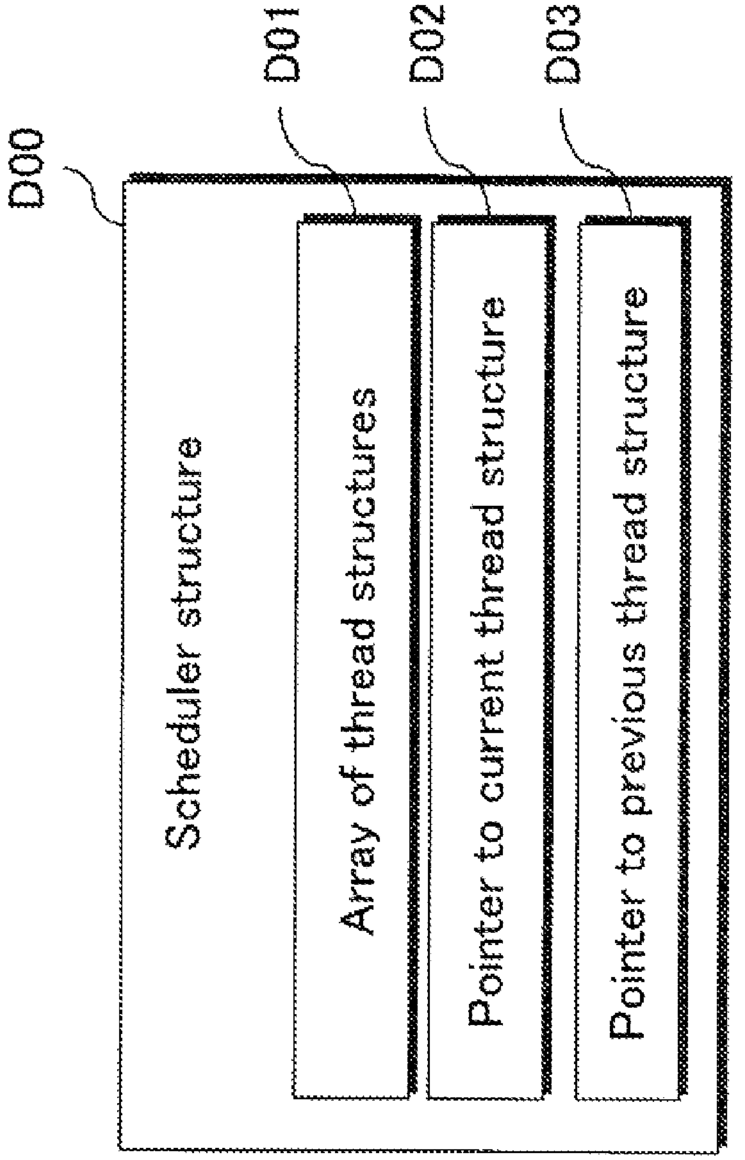
FIG. 3 shows the data configuration of the scheduler structure D00.

FIG. 3 shows the data configuration of the scheduler structure D00.

As shown in FIG. 3, the scheduler structure D00 is composed of an array of thread structures D01, a pointer to current thread structure D02, and a pointer to previous thread structure D03.

Note that the array of thread structures D01 is an array composed of the thread structures D10A through D10C as the elements.

Also, the pointer to current thread structure D02 is a pointer for identifying a current thread structure which is information for controlling a thread (current thread) that has been determined to be executed next by the schedule unit 1020 (hereinafter, the relationship between a thread and a thread structure which is information for controlling the thread is represented as "a thread structure correlated with a thread" or "a thread correlated with a thread structure").

The pointer to previous thread structure D03 is a pointer for identifying a previous thread structure which is correlated with a thread (previous thread) that had been a current thread before the schedule unit 1020 determined a thread to be executed next.

<Semaphore Structure>

Next, the semaphore structure D20 will be explained.

Figure 6:
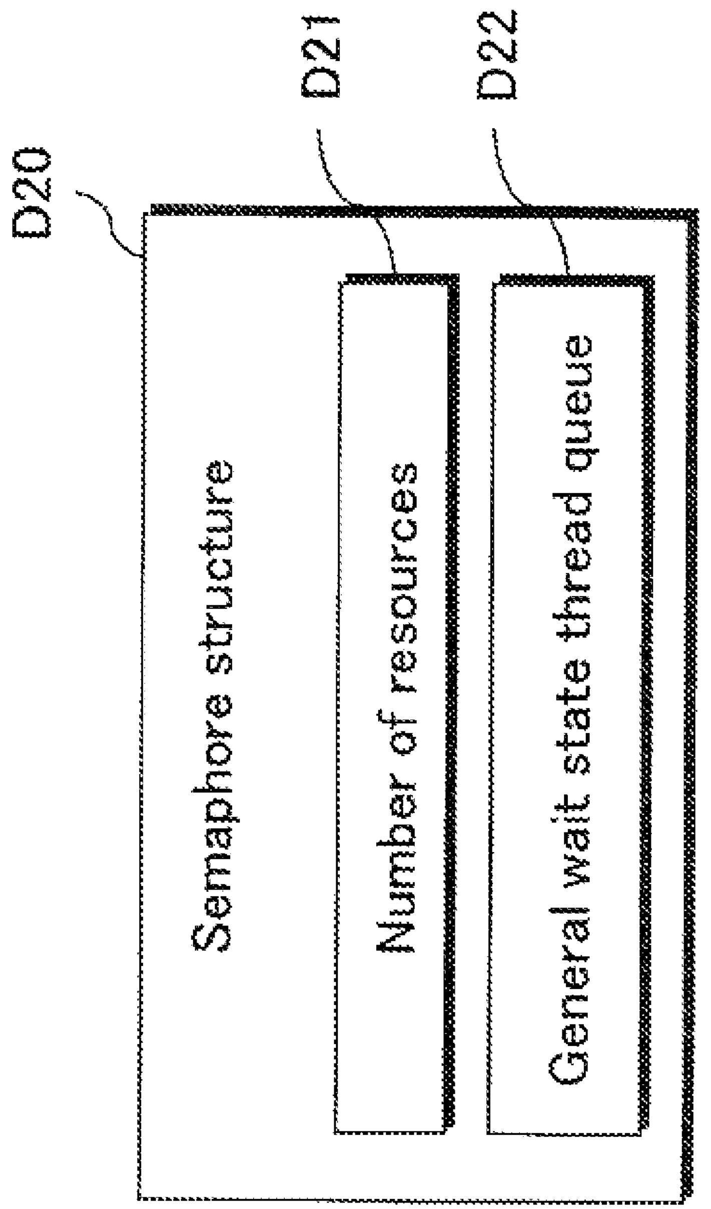
FIG. 6 shows the data configuration of the semaphore structure D20.

FIG. 6 shows the data configuration of the semaphore structure D20.

As shown in FIG. 6, semaphore structure D20 is composed of a number of resources D21 and a general wait state thread queue D22.

The number of resources D21 is information indicating the number of resources managed by the semaphore. The general wait state thread queue D22 is a set of threads which have transited to the general wait state T3 to wait for resources used by the other threads to be released.

<Context Structure>

Next, the context structures D30A through D30C will be explained.

The context structures D30A through D30C are information indicating contents of contexts correlated with threads, and are generated before the threads are started. The context structures D30A through D30C have the same data configuration, and thus in the following, the context structure D30A will be described as a representative example.

Figure 7:
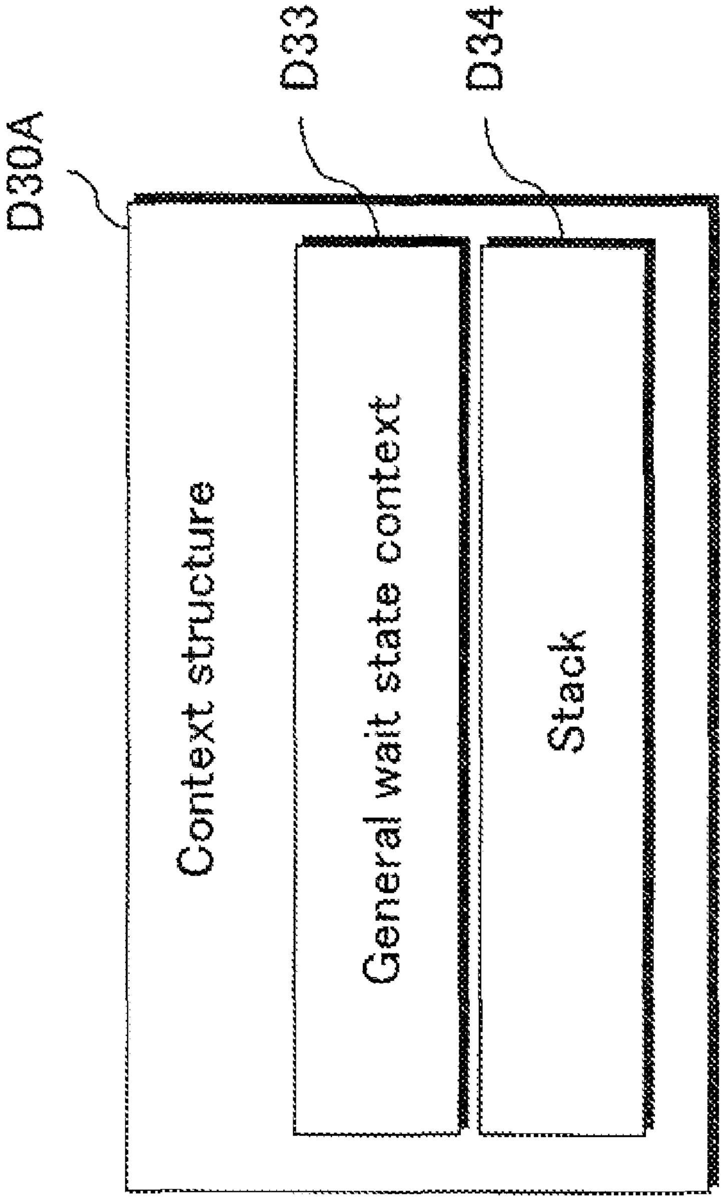
FIG. 7 shows the data configuration of the context structure D30A.

FIG. 7 shows the data configuration of the context structure D30A.

As shown in FIG. 7, the context structure D30A is composed of a general wait state context D33 and a stack D34.

The general wait state context D33 is information indicating a context that was saved from the CPU when a thread transited from the execution state T1 to the general wait state T3. The stack D34 is stack information for each context.

<Message Loop Step>

Figure 8:
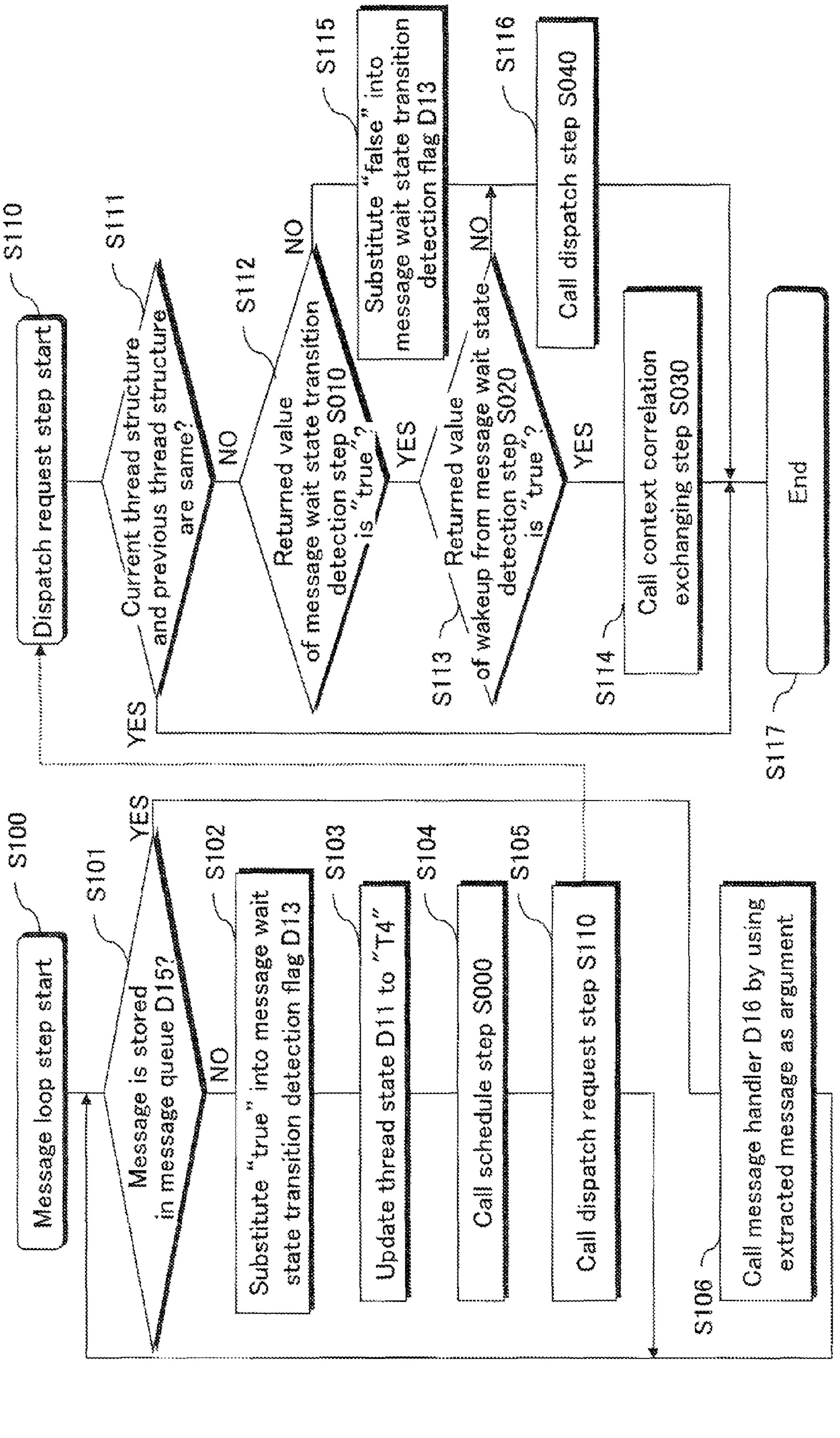
FIG. 8 shows (on the left-hand side) a flowchart illustrating the process performed for each thread, and (on the right-hand side) a flowchart illustrating the operation of the execution control unit 1050 in the information processing device 1000.

FIG. 8 shows (on the left-hand side) a flowchart illustrating the process performed for each thread, and (on the right-hand side) a flowchart illustrating the operation of the execution control unit 1050 in the information processing device 1000.

The message loop step S100 explained in the following is a process of message loops executed by each event-driven-type thread. That is to say, the threads being targets of the multi-thread control performed by the information processing device 1000 have the same process construction in common. Note that the message loop step S100 is stored in the storage unit 1010, and is executed by the CPU provided in the information processing device 1000.

The thread judges whether or not a message is stored in a message queue D15 of a thread structure (current thread structure) correlated with the thread itself (partial step S101). When it judges that a message is stored in the message queue D15 (partial step S101:YES), the thread calls a subroutine (message handler) that is set in the message handler D16 by using a message extracted from the message queue D15 as an argument (partial step S106), and then returns to the process in the partial step S101. Note that the process performed by the subroutine (message handler) may be different for each thread or the same for all threads.

When it is judged in the partial step S101 that no message is stored in the message queue D15 (partial step S101:NO), the message wait state transition detection flag D13 of the current thread structure is updated to "true", and the thread state D11 is updated to "T4" (partial steps S102 and S103).

Then, the thread calls a schedule step S000 and a dispatch request step S110 in sequence (partial steps S104 and S105), and after these processes are completed, returns to the process in the partial step S101.

The processes performed in the schedule step S000 and the dispatch request step S110 will be explained later. Through the processes in the partial steps S104 and S105, a thread to be executed next is determined by the OS and switching between threads is performed.

In this way, as far as a message is stored in the message queue D15 (partial step S101:YES), the thread executes a subroutine (message handler), and after the message queue D15 becomes empty (partial step S101:NO), the thread sets a flag (message wait state transition detection flag D13) indicating a transition to the message wait state T4, is caused by the OS to transit to the message wait state T4, and then when the thread transits to the execution state T1, the process returns to the partial step S101 to restart therefrom.

As described above, all threads have the same process construction in common. Accordingly, when switching between a thread that transited to the message wait state T4 and a thread that has been in the message wait state T4 is performed, the same data is indicated by the contexts of the two threads.

<Operation>

Next, the operation of the information processing device 1000 provided with the above construction will be explained.

<Schedule Step>

First, the schedule step S000 called by the partial step S104 in the message loop step will be explained.

Figure 9:
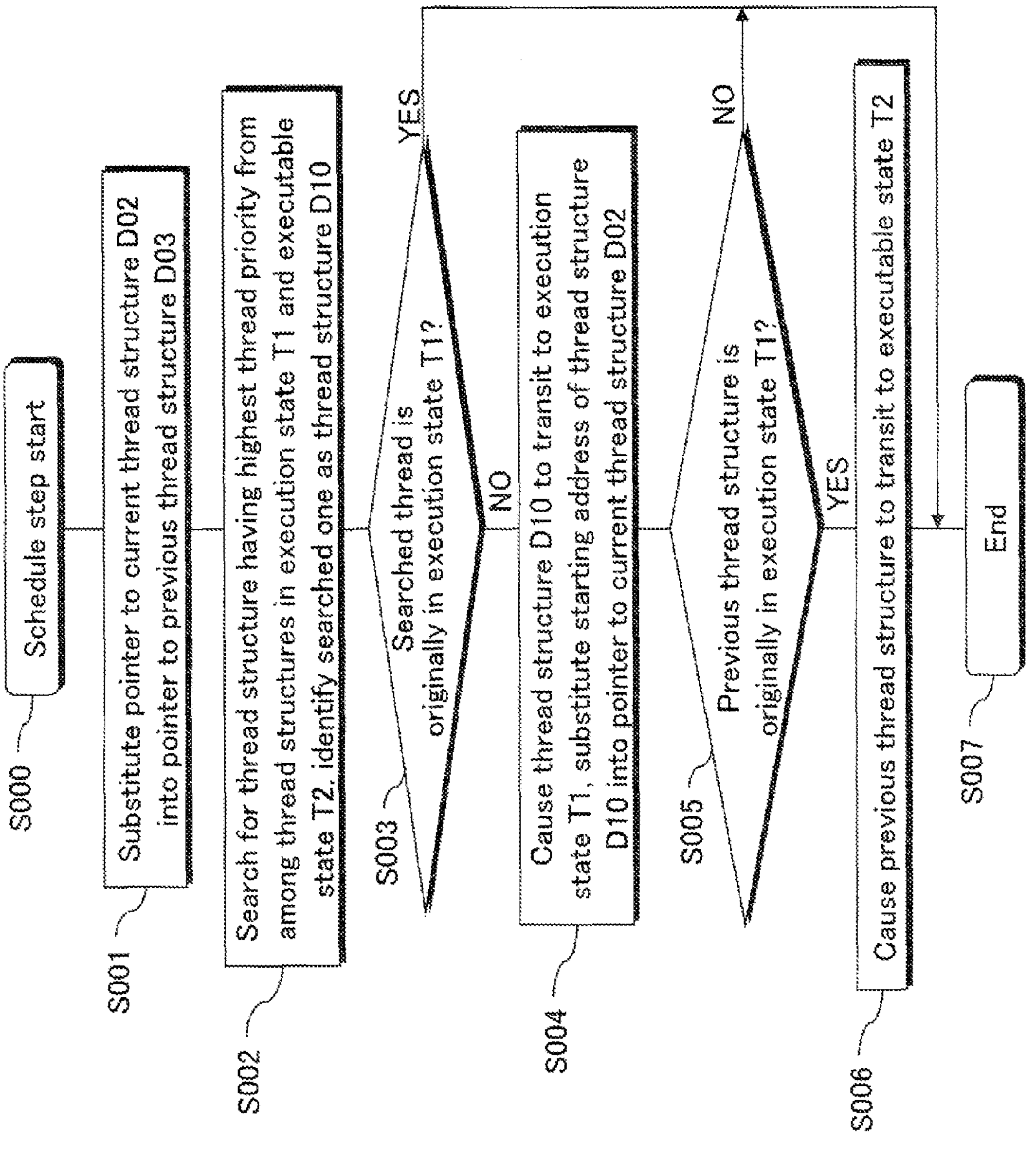
FIG. 9 is a flowchart showing the operation of the schedule unit 1020 provided in the information processing device 1000.

FIG. 9 is a flowchart showing the operation of the schedule unit 1020 provided in the information processing device 1000.

The schedule unit 1020 substitutes the pointer to current thread structure D02 into the pointer to previous thread structure D03 of the scheduler structure D00 (partial step S001).

Next, a thread structure having the highest thread priority D12 is searched from among thread structures whose thread state D11 is the execution state T1 or the executable state T2 (partial step S002).

Next, it is judged whether or not the thread state D11 of the searched thread structure is the execution state T1 (partial step S003), and when it is judged that the thread state D11 is not the execution state T1 (partial step S003:NO), the following process is performed to cause the searched thread (a thread that is to be a current thread) to transit to the proper state. That is to say, the thread state D11 of the thread structure correlated with the searched thread is updated to the execution state T1, and the pointer to current thread structure D02 is set to a thread structure correlated with the searched thread (partial step S004).

Next, it is judged whether or not the thread state D11 of the previous thread structure is the execution state T1 (partial step S005), and when it is judged that the thread state D11 is the execution state T1 (partial step S005:YES), the thread state D11 of the previous thread structure is updated to the executable state T2 so that the state of the previous thread transits (partial step S006), and the process of the schedule step is ended (partial step S007). Also, when it is judged that the thread state D11 is not the execution state T1 (partial step S005:NO), any process is not performed in particular and the process of the schedule step is ended (partial step S007).

Also, when it is judged that the thread state D11 is the execution state T1 (partial step S003:YES), the searched thread does not need to transit because it is originally in the execution state T1, thus any process is not performed in particular and the process of the schedule step is ended (partial step S007).

<Dispatch Request Step>

Next, the dispatch request step S110 called by the partial step S105 in the message loop step will be explained with reference to the flowchart shown on the right-hand side of FIG. 8.

First, the execution control unit 1050 judges whether or not the current thread structure and the previous thread structure are the same (partial step S111). That is to say, it is judged whether or not the pointer to current thread structure D02 and the pointer to previous thread structure D03 are the same.

When it is judged in the partial step S111 that the current thread structure and the previous thread structure are the same (partial step S111:YES), there is no need to perform switching between threads, thus the process of the dispatch request step is ended (partial step S117). When it is judged in the partial step S111 that the current thread structure and the previous thread structure are not the same (partial step S111:NO), the process of switching between threads is performed as follows.

That is to say, the execution control unit 1050 judges whether or not the returned value of a message wait state transition detection step S010 is "true" (partial step S112). The message wait state transition detection step S010 will be explained later. Since the value of the message wait state transition detection flag D13 of the previous thread structure is to be the returned value, the partial step S112 is equivalent to a judgment on whether or not a thread correlated with the previous thread structure transits to the message wait state T4.

When it is judged that the returned value is "true" (partial step S112:YES), the execution control unit 1050 judges whether or not the returned value of a wakeup from message wait state detection step S020 is "true" (partial step S113). The wakeup from message wait state detection step S020 will be explained later. Since the value of the message wait state transition detection flag D13 of the current thread structure is to be the returned value, the partial step S113 is equivalent to a judgment on whether a thread correlated with the current thread structure has transited to the message wait state T4 (current state) from the execution state T1 (previous state).

When it is judged that the returned value is "true" (partial step S113:YES), the content of data indicated by the context of the thread correlated with the previous thread structure matches the content of data indicated by the context of the thread correlated with the current thread structure. Thus the execution control unit 1050 calls a context correlation exchanging step S030 (partial step S114), and after the process is performed by the step, ends the process of the dispatch request step (partial step S117). The context correlation exchanging step S030 will be explained later, but the step performs a process of exchanging a correlation (pointer) pointing to a context correlated with the previous thread with a correlation (pointer) pointing to context correlated with the current thread.

When it is judged in the partial step S113 that the returned value is "false" (partial step S113:NO), the content of data indicated by the context of the thread correlated with the previous thread structure does not match the content of data indicated by the context of the thread correlated with the current thread structure. Thus the execution control unit 1050 calls a dispatch step S040 (partial step S116), and after the process is performed by the step, ends the process of the dispatch request step (partial step S117). The dispatch step S040 will be explained later, but the step performs a context saving/setting process.

When it is judged in the partial step S112 that the returned value is "false" (partial step S112:NO), the execution control unit 1050 updates the message wait state transition detection flag D13 of the current thread structure to "false" (partial step S115), and proceeds to partial step S116.

In this way, in the dispatch request step S110, the process of the dispatch step S040 or the context correlation exchanging step S030 is performed in accordance with the results of judgments performed in the partial steps S112 and S113.

As described above, in the dispatch step S040, the context save/set process is performed, and in the context correlation exchanging step S030, the process of exchanging a correlation (pointer) pointing to a context correlated with the previous thread with a correlation (pointer) pointing to context correlated with the current thread is performed.

In general, the context correlation exchanging step is performed faster than the context save/set process. Therefore when switching between threads is performed, the more times the context correlation exchanging step S030 is called, the more the program processing efficiency as a whole is improved, compared with the case where the dispatch step S040 is always called.

<Message Wait State Transition Detection Step>

Next, the message wait state transition detection step S010 performed in the partial step S112 of the dispatch request step will be explained.

Figure 10:
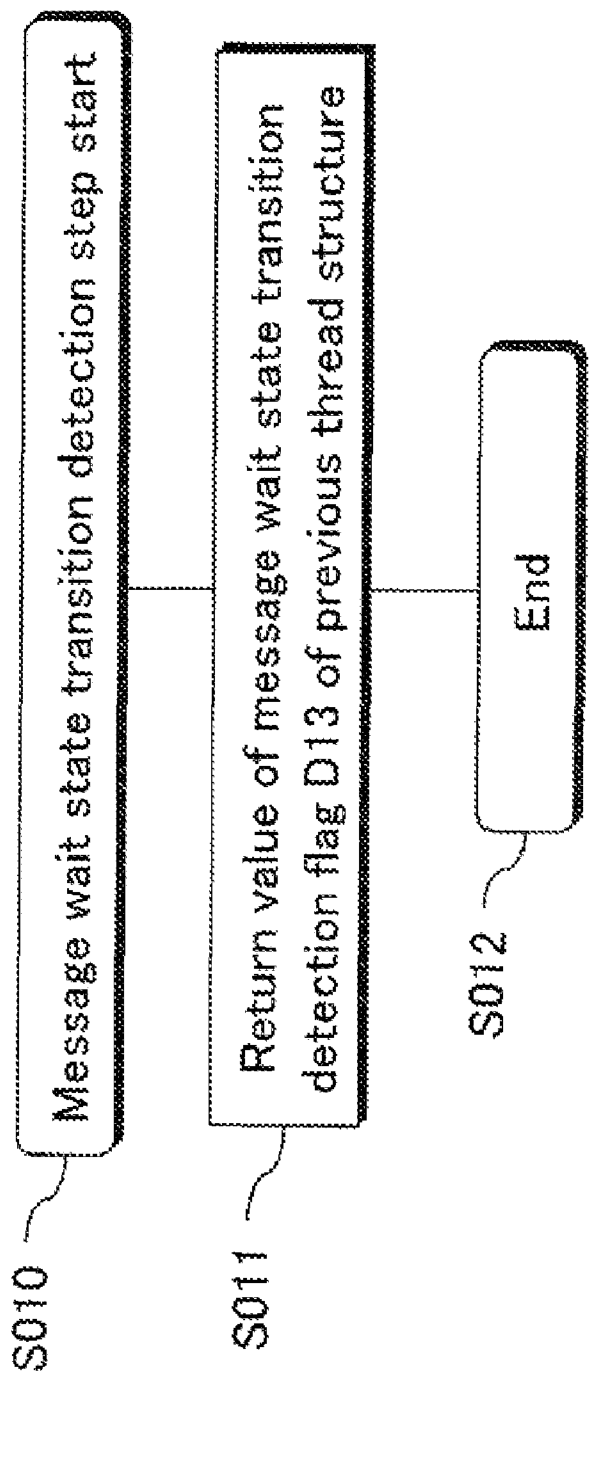
FIG. 10 is a flowchart showing the operation of the transition detecting unit 1030 provided in the information processing device 1000.

FIG. 10 is a flowchart showing the operation of the transition detecting unit 1030 provided in the information processing device 1000.

The transition detecting unit 1030 returns the value of the message wait state transition detection flag D13 of the previous thread structure (partial step S011), and ends the process of the message wait state transition detection step (partial step S012).

<Wakeup from Message Wait State Detection Step>

Next, the wakeup from message wait state detection step S020 performed in the partial step S113 of the dispatch request step will be explained.

Figure 11:
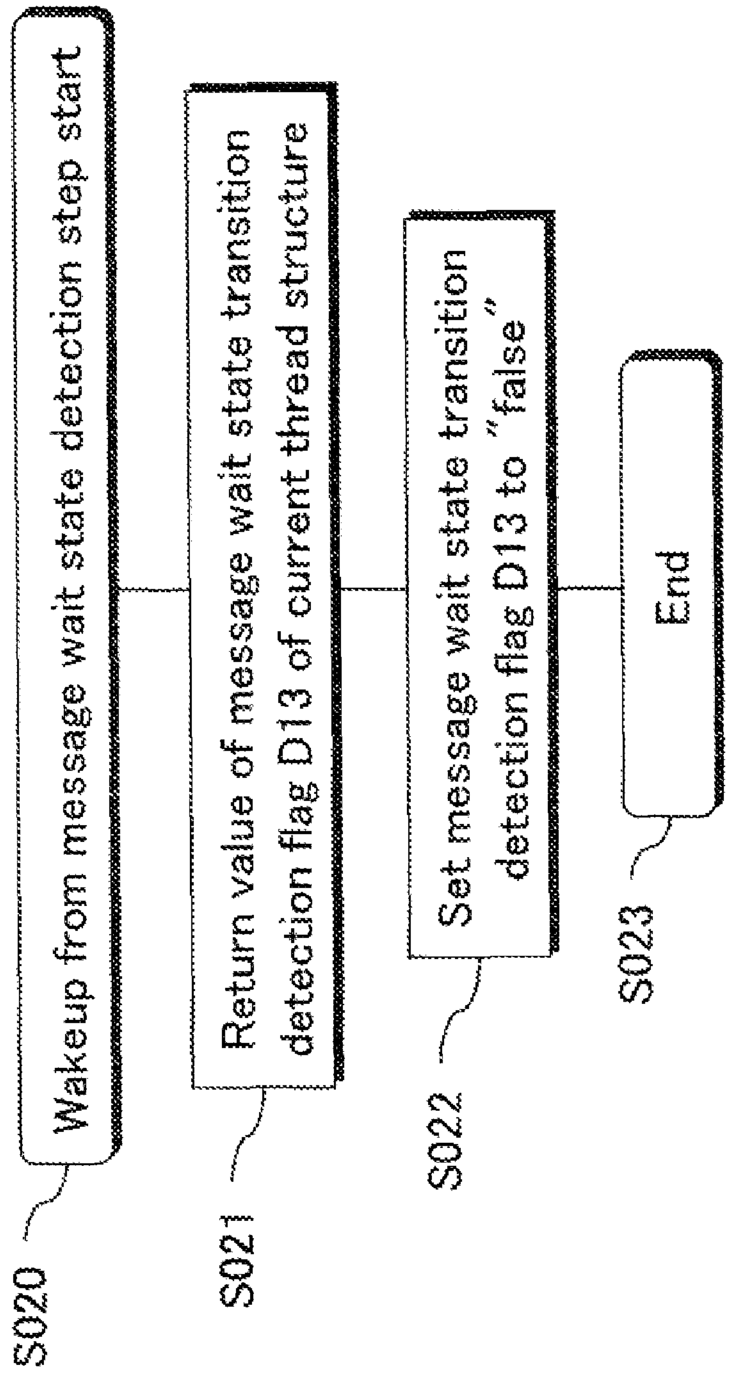
FIG. 11 is a flowchart showing the operation of the wakeup detecting unit 1040 provided in the information processing device 1000.

FIG. 11 is a flowchart showing the operation of the wakeup detecting unit 1040 provided in the information processing device 1000.

The wakeup detecting unit 1040 returns the value of the message wait state transition detection flag D13 of the current thread structure (partial step S021), sets the value of the message wait state transition detection flag D13 to "false" (partial step S022), and ends the process of the wakeup from message wait state detection step (partial step S023).

<Context Correlation Exchanging Step>

Next, the context correlation exchanging step S030 called by the partial step S114 of the dispatch request step will be explained.

Figure 12:
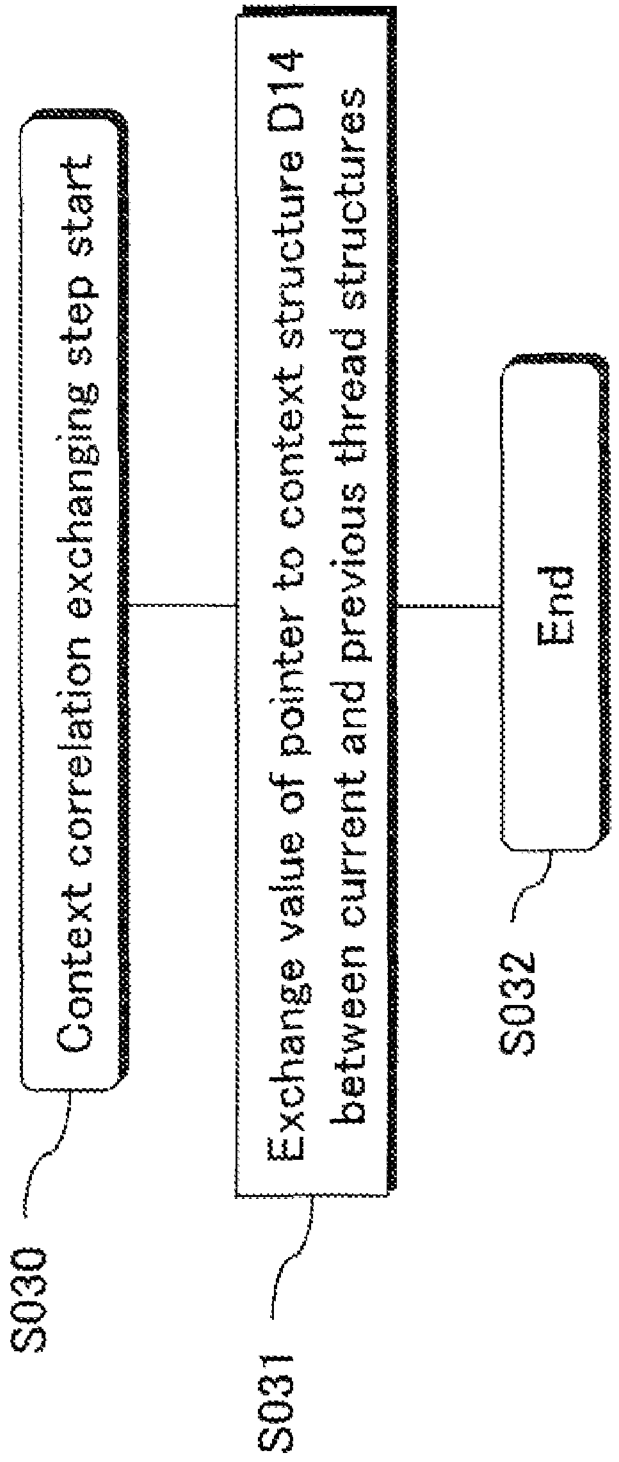
FIG. 12 is a flowchart showing the operation of the context correlation exchanging unit 1071 provided in the information processing device 1000.

FIG. 12 is a flowchart showing the operation of the context correlation exchanging unit 1071 provided in the information processing device 1000.

The context correlation exchanging unit 1071 exchanges the value of the pointer to context structure D14 of the current thread structure with the value of the pointer to context structure D14 of the previous thread structure (partial step S031), and ends the process of the context correlation exchanging step (partial step S032).

In this way, by exchanging the pointer to context structure D14 between the current thread structure and the previous thread structure, it is possible to hold the context of the previous thread appropriately without performing the context save process. Also, the state in which the current thread is correlated with the context can be maintained. Accordingly, when the context of the current thread needs to be saved, it can be saved as conventionally done.

<Dispatch Step>

Next, the dispatch step S040 called by the partial step S116 of the dispatch request step will be explained.

Figure 13:
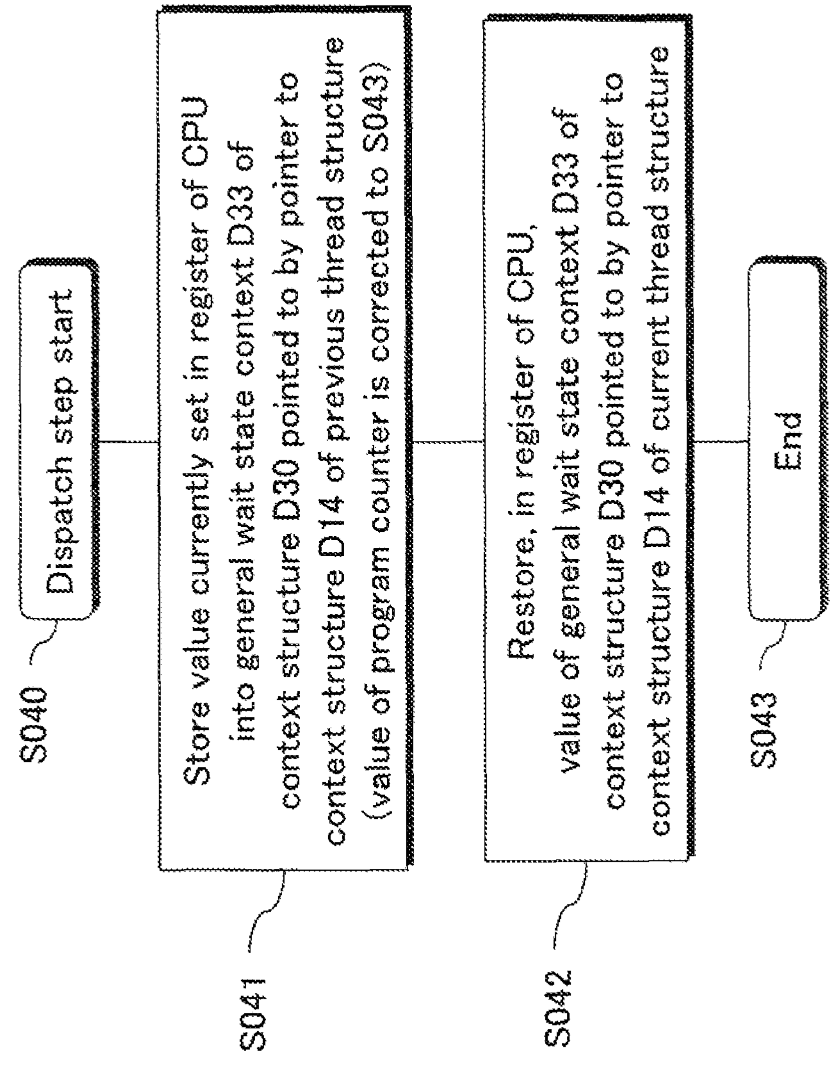
FIG. 13 is a flowchart showing the operation of the dispatch unit 1060 provided in the information processing device 1000.

FIG. 13 is a flowchart showing the operation of the dispatch unit 1060 provided in the information processing device 1000.

First, the dispatch unit 1060 stores the value set in the register of the CPU as the general wait state context D33 of the context structure D30 pointed to by the pointer to context structure D14 of the previous thread structure. Note that the value of the program counter (also referred to as "PC") is corrected to S043 before it is stored (partial step S041). This correction of the value of the program counter to S043 means that, when the thread correlated with the previous thread structure transits to the execution state T1, the process is restarted from the partial step S043.

Next, the dispatch unit 1060 sets, in the register of the CPU, the value of the general wait state context D33 of the context structure D30 pointed to by the pointer to context structure D14 of the current thread structure (partial step S042), and ends the process of the dispatch step (partial step S043).

<Specific Example>

Taking as an example the case where switching occurs between a thread correlated with the thread structure D10A and a thread correlated with the thread structure D10B, the operation of information processing device 1000 will be explained specifically.

In the following, it is assumed that the pointer D02 for the current thread structure is "D10A", the thread state D11 of the thread structure D10A is "T1", the message queue D15 is empty, and the pointer to context structure D14 is "D30A".

Also, it is assumed that the thread state D11 of the thread structure D10B is "T2", the message wait state transition detection flag D13 is "true", the pointer to context structure D14 is "D30B", and the thread correlated with the thread structure D10A is to start the process of the partial step S101 in the message loop step S100.

Since there is no message in the message queue D15 of the thread structure D10A (the partial step S101 shown on the left-hand side of FIG. 8: NO), the thread correlated with the thread structure D10A updates the message wait state transition detection flag D13 to "true", and the thread state D11 to "T4" (partial steps S102 and S103).

Next, the thread correlated with the thread structure D10A calls the schedule step S000 which is a subroutine (partial step S104).

When the schedule step S000 is called, the execution control unit 1050 of the information processing device 1000 instructs the schedule unit 1020 to perform a process.

Upon receiving the instruction, the schedule unit 1020 substitutes the pointer to current thread structure D02 (D10A) into the pointer to previous thread structure D03 of the scheduler structure D00 (partial step S001 shown in FIG. 9).

Next, the schedule unit 1020 searches for a thread structure having the highest thread priority D12 (in this example, assumed to be the thread structure D10B) from among thread structures whose thread state D11 is the execution state T1 or the executable state T2 (partial step S002). Since the thread state D11 of the thread structure D10B (T2) is not the execution state T1 (partial step S003:NO), the schedule unit 1020 updates the thread state D11 to "T1", and sets the pointer to current thread structure D02 to "D10B" (partial step S004).

Next, since the thread state D11 of the previous thread structure (D10A) is not "T1" (partial step S005:NO), the process of the schedule step is ended (partial step S007).

Returning again to the process of the message loop step, the thread correlated with the thread structure D10A calls the dispatch request step S110 (partial step S105).

When the dispatch request step S110 is called, the execution control unit 1050 calls the context correlation exchanging step S030 (partial step S114) because the pointer to current thread structure D02 (D10B) and the pointer to previous thread structure D03 (D10A) are not the same (partial step S111 shown on the right-hand side of FIG. 8: NO), the returned value of the message wait state transition detection step S010 is "true" (partial step S112:YES), and the returned value of the wakeup from message wait state detection step S020 is also "true" (partial step S113:YES).

Upon receiving the instruction from the execution control unit 1050, the context correlation exchanging unit 1071 exchanges the value (D30B) of the pointer to context structure D14 of the current thread structure with the value (D30A) of the pointer to context structure D14 of the previous thread structure (partial step S031 shown in FIG. 12), and ends the process of the context correlation exchanging step (partial step S032).

Returning again to the dispatch request step, the execution control unit 1050 ends the dispatch request step (partial step S117 shown on the right-hand side of FIG. 8).

In the above example, the context correlation exchanging step S030 is called and switching between threads is performed within the dispatch request step S110. As a result, threads are switched at a high speed compared with the case where the dispatch step S040 is called.

<<Embodiment 2>>

<Outline>

In the information processing device 1000 in Embodiment 1, each thread is correlated with a context without fail. The information processing device in Embodiment 2 to be explained in the following differs from the information processing device 1000 in that it deletes a correlation between the previous thread and a context when the previous thread transits to the message wait state T4.

The information processing device in the present embodiment detects that the current thread has transited to the message wait state T4 (current state) from the execution state T1 (previous state), by detecting that there is no correlation between the current thread and a context. Upon the detection, the information processing device correlates again the current thread, from which the correlation with the context has been deleted, with a context that has been set to be executed from the message loop judgment process. This eliminates the need for a context to be correlated with a thread which is in the message wait state T4 and is stopping the process, thus reducing the total amount of memory use.

Note that in the above description, an explanation is given of a current thread from which a correlation with a context was deleted. However, a current thread which has just been generated and not been correlated with a context can be treated in a similar manner because the thread is to be executed from the message loop judgment process.

In the following description, differences from the information processing device 1000 will be explained mainly.

<Construction>

Figure 14:
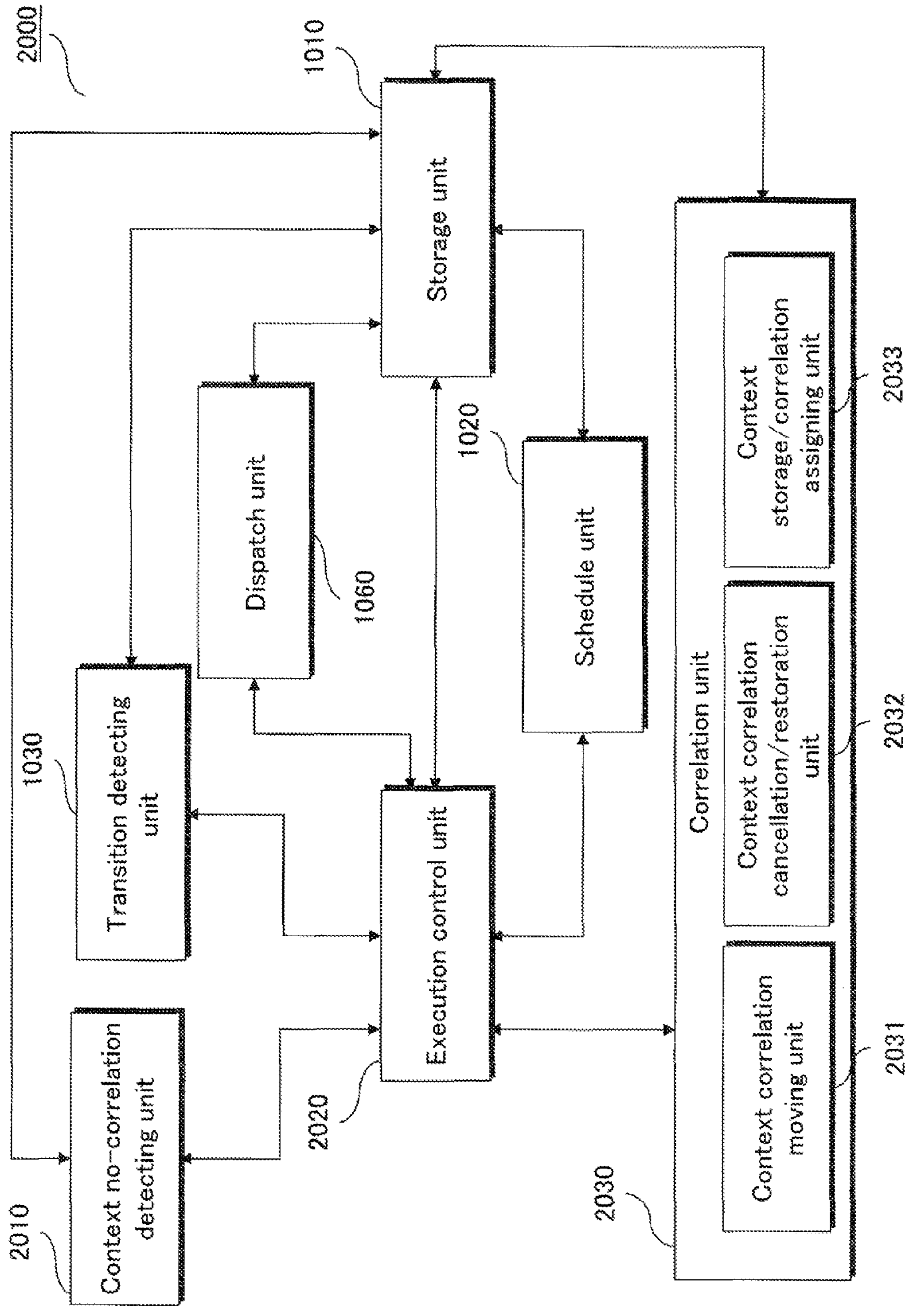
FIG. 14 is functional block diagram showing an information processing device 2000 in Embodiment 2 of the present invention.

FIG. 14 is functional block diagram showing an information processing device 2000 in Embodiment 2 of the present invention.

As shown in FIG. 14, the information processing device 2000 includes, in the functional aspect, a storage unit 1010, a schedule unit 1020, a transition detecting unit 1030, a context no-correlation detecting unit 2010, an execution control unit 2020, and a correlation unit 2030.

Of these, the context no-correlation detecting unit 2010, execution control unit 2020, and correlation unit 2030 are not included in the information processing device 1000 in Embodiment 1. Thus these elements are described in the following.

The context no-correlation detecting unit 2010 has a function to detect whether a context is not correlated with a thread by referring to a current thread structure stored in the storage unit 1010 in accordance with an instruction by the execution control unit 2020.

The execution control unit 2020, like the execution control unit 1050, has a function to instruct either the dispatch unit 1060 or the correlation unit 2030 to perform a process of switching between threads, but differs from the execution control unit 1050 in the following points.

That is to say, the execution control unit 1050 instructs the dispatch unit 1060 to perform a process of switching between threads when any of the detection units does not result in detection. On the other hand, the execution control unit 2020 instructs the dispatch unit 1060 to perform the process of switching between threads only when both the transition detecting unit 1030 and context no-correlation detecting unit 2010 do not result in detection.

That is to say, when any of the transition detecting unit 1030 and the context no-correlation detecting unit 2010 results in detection, the execution control unit 2020 instructs the correlation unit 2030 to perform the process of switching between threads.

The correlation unit 2030 differs from the correlation unit 1070 in that it includes a context correlation moving unit 2031, a context correlation cancellation/restoration unit 2032, and a context storage/correlation assigning unit 2033 instead of the context correlation exchanging unit 1071.

The context correlation moving unit 2031 has a function to, when both the transition detecting unit 1030 and context no-correlation detecting unit 2010 result in detection, correlate a context, which has been correlated with the previous thread, with the current thread, and delete the correlation between the context and the previous thread in accordance with an instruction by the execution control unit 2020.

The context correlation cancellation/restoration unit 2032 has a function to, when the transition detecting unit 1030 results in detection and the context no-correlation detecting unit 2010 does not result in detection, delete the correlation between the context and the previous thread, and set a context correlated with the current thread into the register of the CPU in accordance with an instruction by the execution control unit 2020.

The context storage/correlation assigning unit 2033 has a function to, when the transition detecting unit 1030 does not result in detection and the context no-correlation detecting unit 2010 results in detection, store a value set in the register of the CPU into the storage unit 1010 as a context structure of the previous thread, correlate a context structure, which has not been correlated with a thread, with the current thread, and set the content of the correlated context structure into the register of the CPU in accordance with an instruction by the execution control unit 2020. The content of the context indicated by the context structure correlated with the current thread will be described later.

<Data>

The following describes the data to be used in the multi-thread control by the information processing device 2000.

In the storage unit 1010 of the information processing device 2000, a scheduler structure D40 and context structures D50A through D50C are stored instead of the scheduler structure D00 and context structures D30A through D30C.

In the following, the scheduler structure D40 and the context structures D50A through D50C will be explained centering on their characteristics that are different from those of the scheduler structure D00 and the context structures D30A through D30C. Note that, in the following, it is assumed that the pointer to context structure D14 of thread structures D10A through D10C points to a context structure D50 (i.e. any of the context structures D50A through D50C).

<Scheduler Structure>

First, the scheduler structure D40 will be described.

Figure 15:
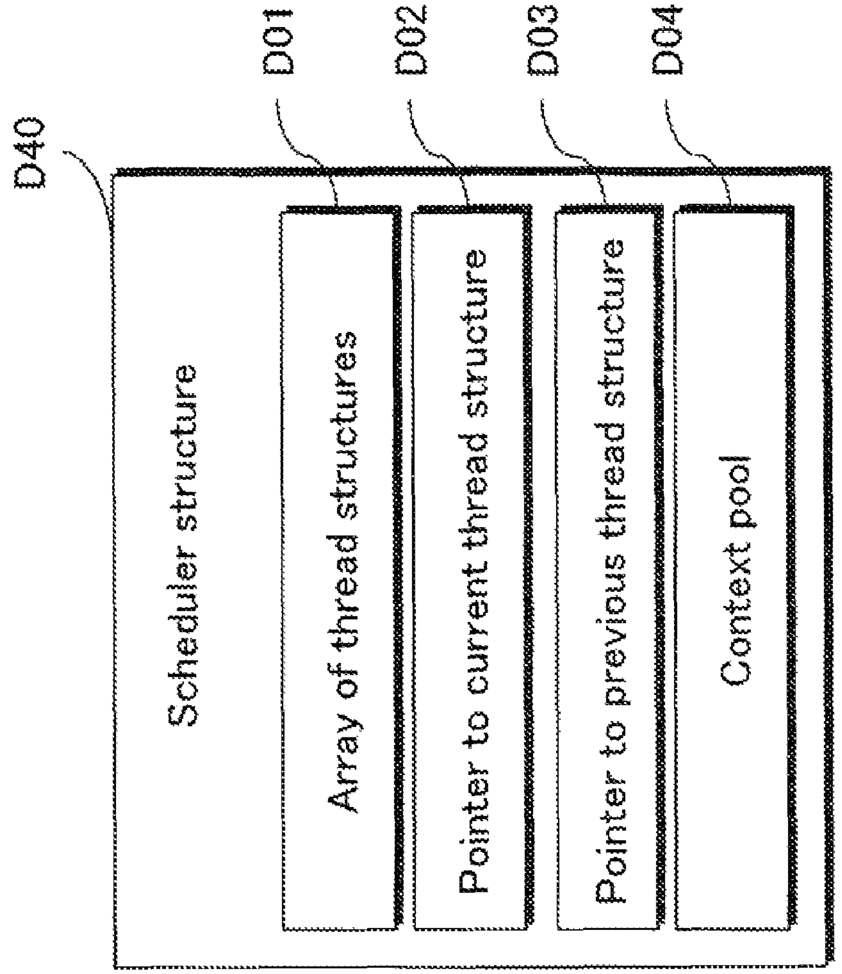
FIG. 15 shows the data configuration of the scheduler structure D40.

FIG. 15 shows the data configuration of the scheduler structure D40.

As shown in FIG. 15, the scheduler structure D40 differs from the scheduler structure D00 in that it includes a context pool D04.

The context pool D04 is information for identifying a context structure which has not been correlated with a thread. When a correlation between a previous thread and a context is deleted by the context correlation cancellation/restoration unit 2032, information identifying a context structure correlated with this context is stored in the context pool D04; and when a context structure identified by the context pool D04 is correlated with a current thread by the context storage/correlation assigning unit 2033, information identifying this context structure is deleted from the context pool D04.

<Context Structure>

Next, the context structures D50A through D50C will be described.

The context structures D50A through D50C are information have the same data configuration, and thus in the following, the context structure D50A will be described as a representative example.

Figure 16:
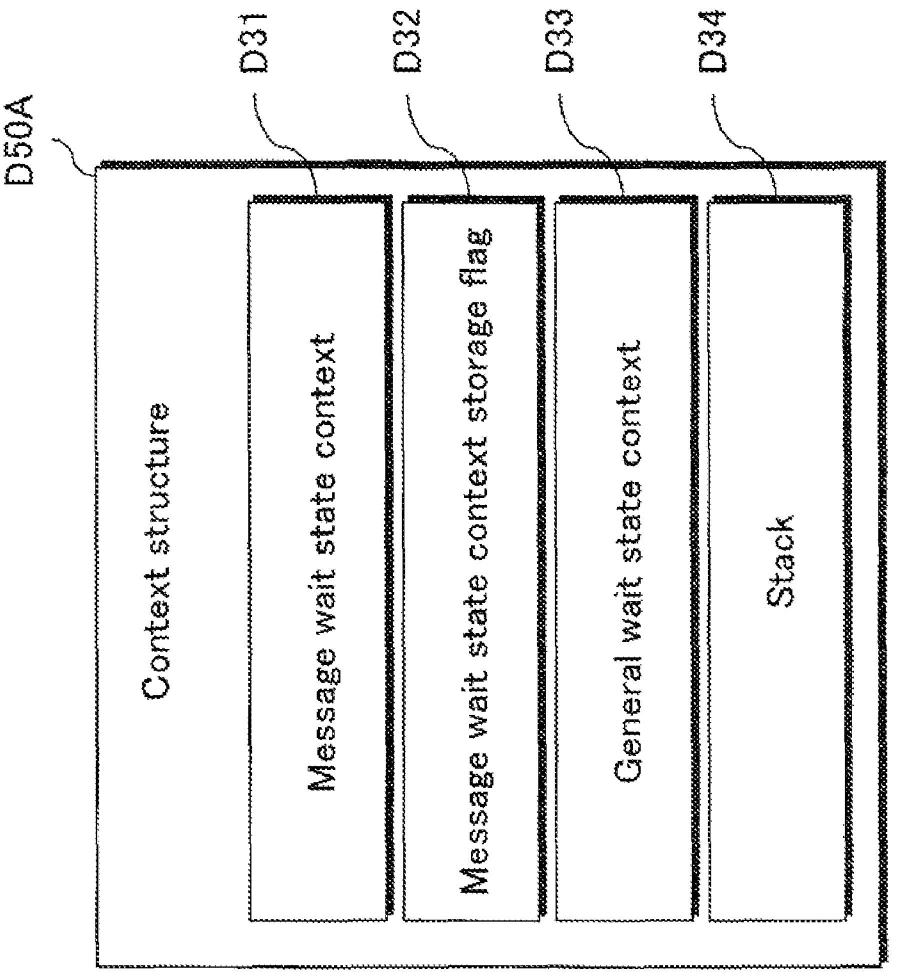
FIG. 16 shows the data configuration of the context structure D50A.

FIG. 16 shows the data configuration of the context structure D50A.

As shown in FIG. 16, the context structure D50A differs from context structure D30A in that it includes a message wait state context D31 and a message wait state context storage flag D32.

Here the message wait state context D31 is information indicating a context correlated with a current thread by the context storage/correlation assigning unit 2033. The context is set so that a thread, which has transited to the message wait state T4 (current state) from the execution state T1 (previous state), can be restarted, and the context is correlated even when a newly generated thread becomes a current thread.

The message wait state context storage flag D32 is information indicating that the message wait state context D31 is a valid context.

Also, in the following description, it is assumed that the process of the message loop executed by each of the event-driven-type threads is the same as that in Embodiment 1 (the message loop step S100 shown on the left-hand side of FIG. 8), a subroutine called in the partial step S105 is an improved dispatch request step S130.

<Operation>

Next, the operation of the information processing device 2000 provided with the above construction will be explained.

<Improved Dispatch Request Step>

First, the improved dispatch request step S130 will be explained.

Figure 17:
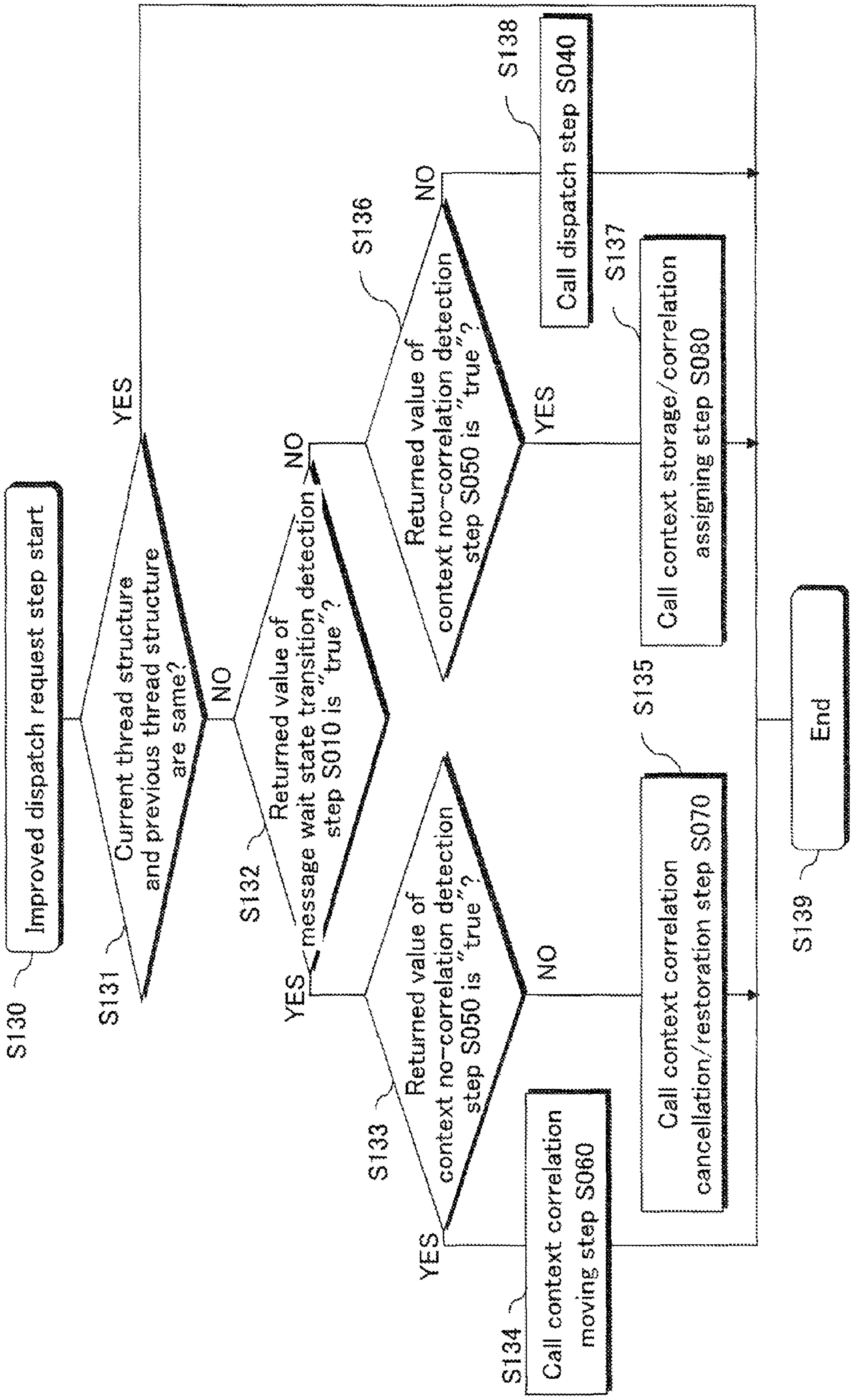
FIG. 17 is a flowchart showing the operation of the execution control unit 2020 provided in the information processing device 2000.

FIG. 17 is a flowchart showing the operation of the wakeup detecting unit 2020 provided in the information processing device 2000.

The partial steps S131 and S132 are processed similarly to partial steps S111 and S112 of the dispatch request step S110 shown in FIG. 8, respectively.

When it is judged In the partial step S132 that a returned value of the message wait state transition detection step S010 is "true" (partial step S132:YES), the execution control unit 2020 judges whether or not a returned value of a context no-correlation detection step S050 is "true" (partial step S133). The content of the context no-correlation detection step S050 will be described later, but in the partial step S133, it is judged whether or not the pointer to context structure D14 of a current thread structure is NULL. This is because the returned value is "true" when the pointer to context structure D14 of a current thread structure is NULL.

When it is judged in the partial step S133 that the returned value is "true" (partial step S133:YES), it indicates that the content of data indicated by the context of the thread correlated with the previous thread structure matches the content of data indicated by the context of the thread correlated with the current thread structure, thus the execution control unit 2020 calls a context correlation moving step S060 (partial step S134), and after the process of the step is completed, the process of the improved dispatch request step is ended (partial step S139). The content of the context correlation moving step S060 will be described later. The context correlation moving step S060 performs the process of correlating a context, which has been correlated with a previous thread, with a current thread (setting of a pointer), and the process of deleting a correlation (pointer) between a previous thread and a context.

When it is judged in the partial step S133 that the returned value is "false" (partial step S133:NO), the execution control unit 2020 calls a context correlation cancellation/restoration step S070 (partial step S135), and after the process of the step is completed, the process of the improved dispatch request step is ended (partial step S139). The content of the context correlation cancellation/restoration step S070 will be described later. The context correlation cancellation/restoration step S070 performs the process of setting a context and the process of deleting a correlation (pointer) between a previous thread and a context.

When it is judged in the partial step S132 that a returned value of the message wait state transition detection step S010 is "false" (partial step S132:NO), the execution control unit 2020 performs a process similar to that of the partial step S133 (partial step S136).

When it is judged in the partial step S136 that the returned value is "true" (partial step S136:YES), the execution control unit 2020 calls a context storage/correlation assigning step S080 (partial step S137), and after the process of the step is completed, the process of the improved dispatch request step is ended (partial step S139). The content of the context storage/correlation assigning step S080 will be described later. The context storage/correlation assigning step S080 performs a context save process and performs a context setting process after correlating a context (message wait state context D31), which has not been correlated with a thread, with a current thread.

When it is judged in the partial step S136 that the returned value is "false" (partial step S136:NO), the execution control unit 2020 calls a dispatch step S040 (partial step S138), and after the process of the step is completed, the process of the improved dispatch request step is ended (partial step S139).

As described above, the context save/set process is performed in the dispatch step S040 and the context storage/correlation assigning step S080, but not in the context correlation moving step S060, in which only the pointer setting and deleting processes are performed. Also, in the context correlation cancellation/restoration step S070, although the context setting process is performed, the context save process is not performed, but the pointer deleting process is performed.

Accordingly, when switching between threads is performed, the more times the context correlation moving step S060 and the context correlation cancellation/restoration step S070 are called, the more the program processing efficiency as a whole is improved, compared with the case where the dispatch step S040 is always called.

<Context No-Correlation Detection Step>

Next, the context no-correlation detection step S050 in the partial steps S133 and S136 of the improved dispatch request step will be explained.

Figure 18:
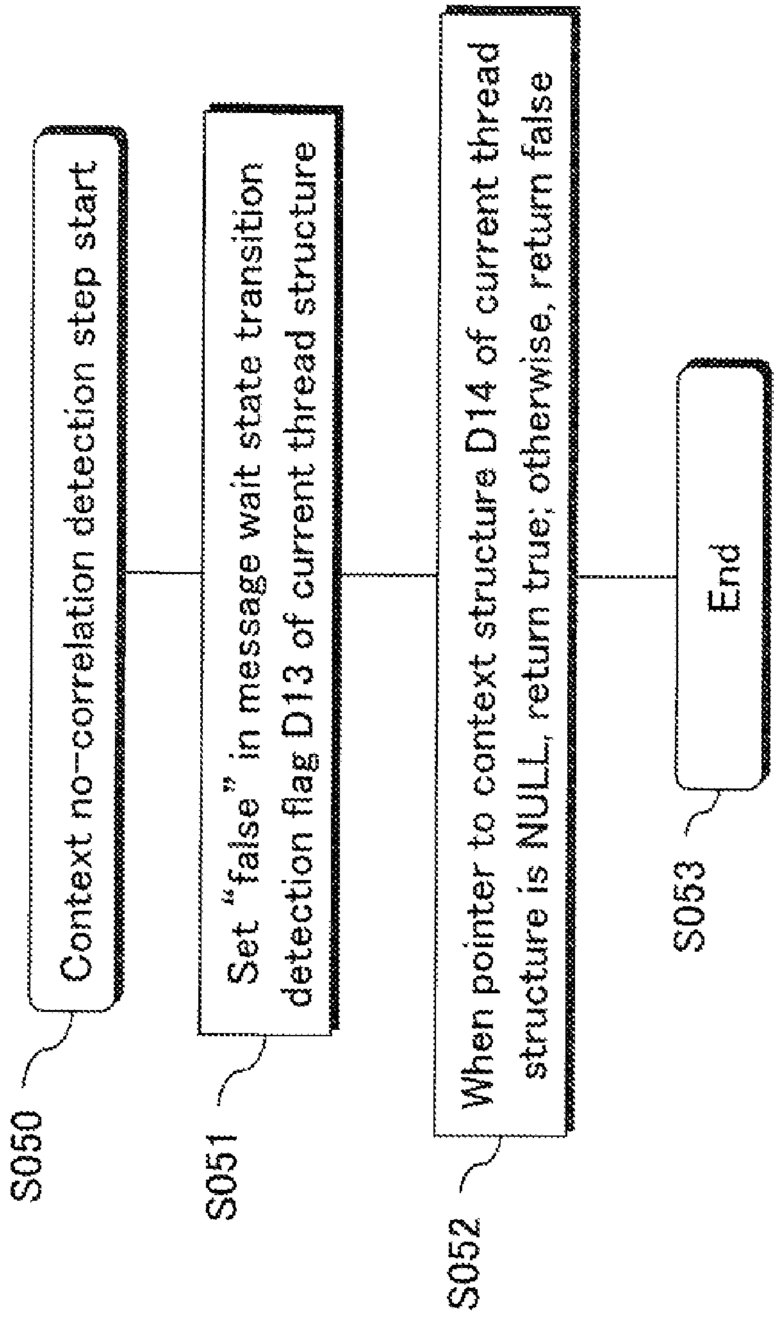
FIG. 18 is a flowchart showing the operation of the context no-correlation detecting unit 2010 provided in the information processing device 2000.

FIG. 18 is a flowchart showing the operation of the context no-correlation detecting unit 2010 provided in the information processing device 2000.

The context no-correlation detecting unit 2010 sets "false" in the message wait state transition detection flag D13 of the current thread structure (partial step S051), returns "true" when the pointer to context structure D14 of the current thread structure is NULL, otherwise, returns "false" (partial step S052), and ends processing of the context no-correlation detection step (partial step S053).

<Context Correlation Moving Step>

Next, the context correlation moving step S060 called by the partial step S134 of the improved dispatch request step will be explained.

Figure 19:
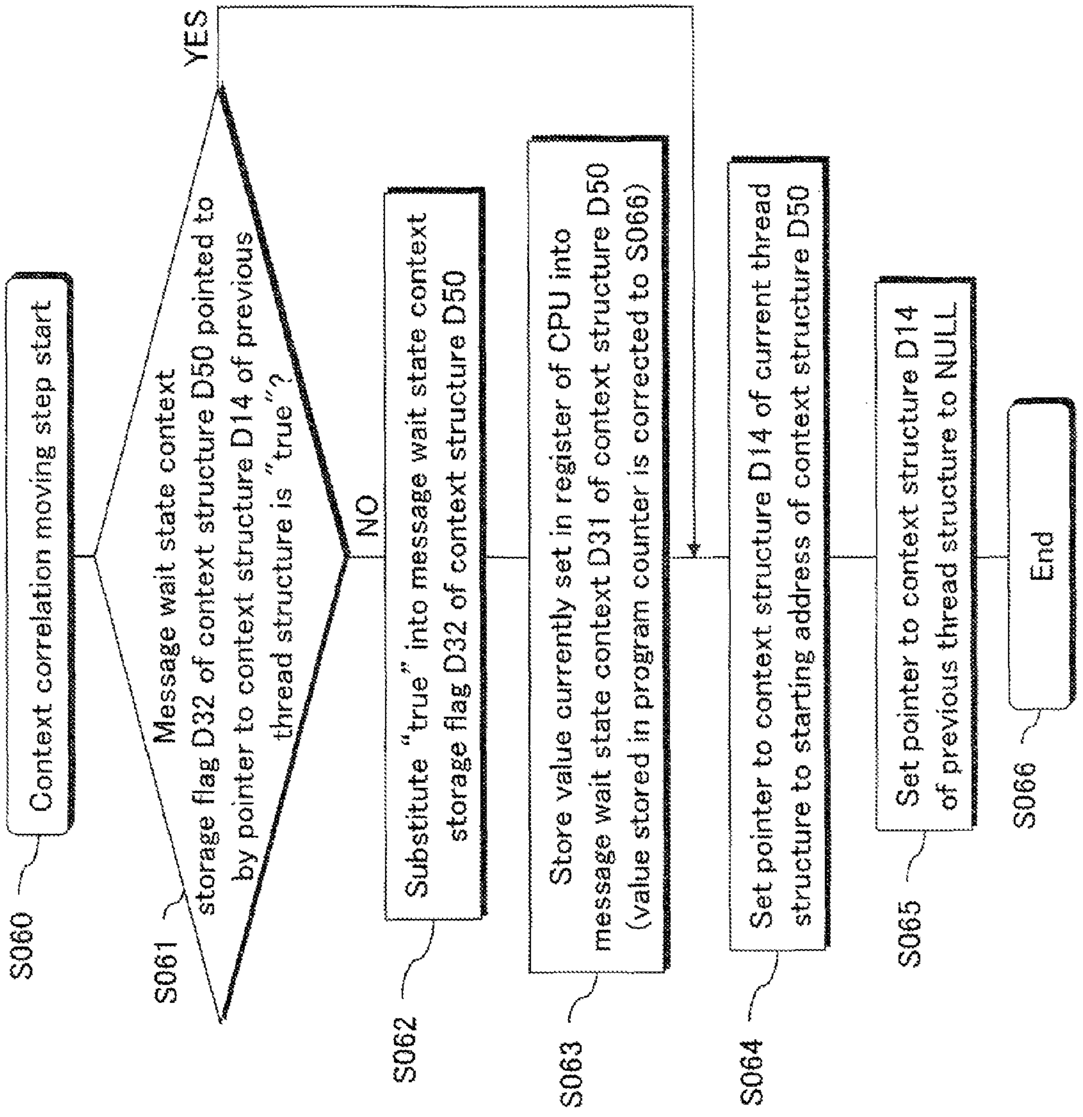
FIG. 19 is a flowchart showing the operation of the context correlation moving unit 2031 provided in the information processing device 2000.

FIG. 19 is a flowchart showing the operation of the context correlation moving unit 2031 provided in the information processing device 2000.

The context correlation moving unit 2031 judges whether or not the message wait state context storage flag D32 of the context structure D50 pointed to by the pointer to context structure D14 of the previous thread structure is "true" (partial step S061), and when it is "false" (partial step S061:NO), sets the message wait state context storage flag D32 to "true" (partial step S062).

Next, the context correlation moving unit 2031 stores the value currently set in the register of the CPU into the message wait state context D31 of the context structure D50 pointed to by the pointer to context structure D14 of the previous thread structure. In so doing, the value stored in the PC is corrected to "S066" (partial step S063).

After the process of the partial step S063, or when it is judged in the partial step S061 that the message wait state context storage flag D32 is "true" (partial step S061:YES), the context correlation moving unit 2031 sets the pointer to context structure D14 of the previous thread structure into the pointer to context structure D14 of the current thread structure (partial step S064), sets "NULL" into the pointer to context structure D14 of the previous thread structure (partial step S065), and ends the process of the context correlation moving step (partial step S066).

<Context Correlation Cancellation/Restoration Step>

Next, the context correlation cancellation/restoration step S070 called by the partial step S135 of the improved dispatch request step will be explained.

Figure 20:
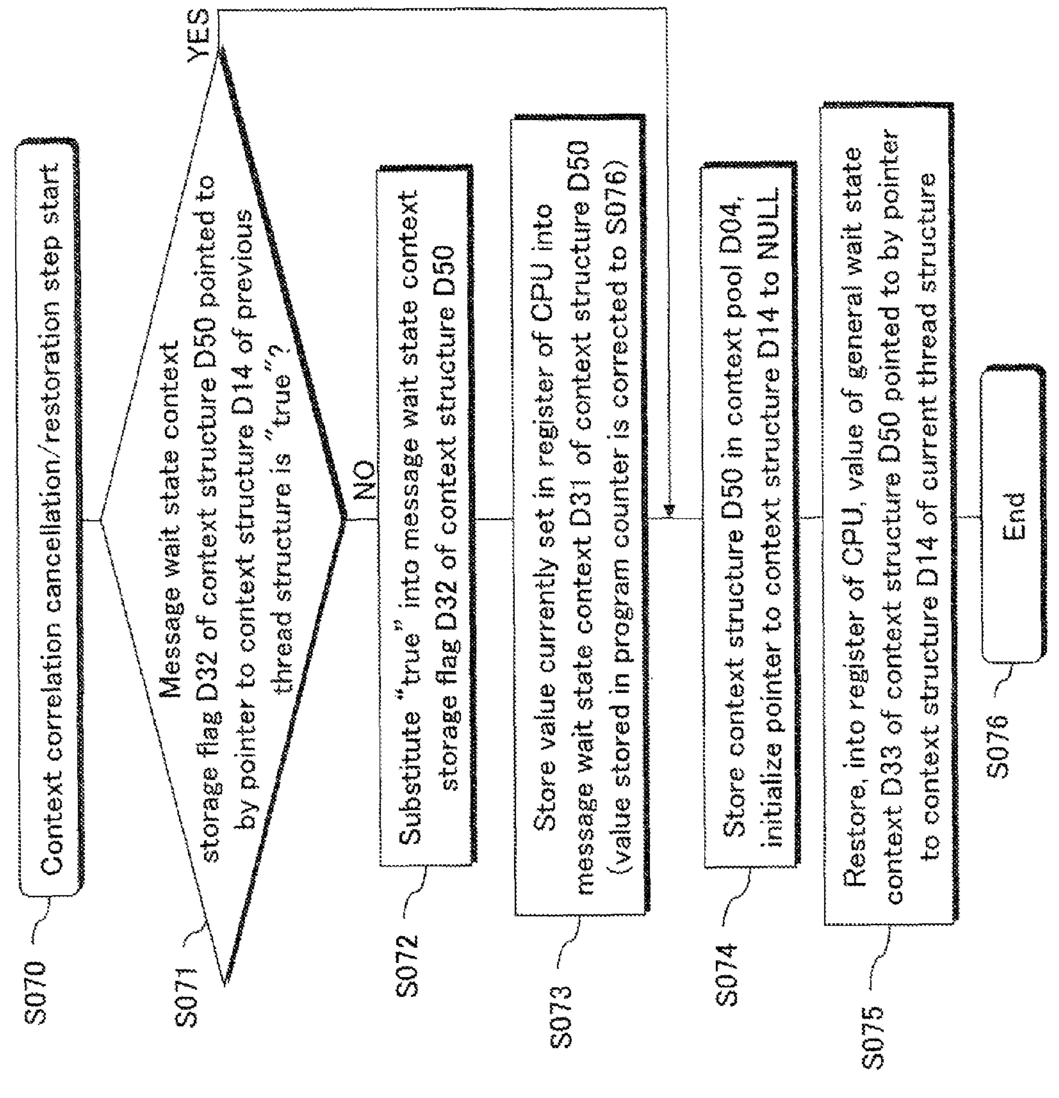
FIG. 20 is a flowchart showing the operation of the context correlation cancellation/restoration unit 2032 provided in the information processing device 2000.

FIG. 20 is a flowchart showing the operation of the context correlation cancellation/restoration unit 2032 provided in the information processing device 2000.

The partial steps S071 through S073 are processed similarly to partial steps S061 through S063 of the context correlation moving step S060 shown in FIG. 19. Note that in the partial step S073, the value stored in the PC is corrected to "S076".

Next, the context correlation cancellation/restoration unit 2032 stores the context structure D50 pointed to by the pointer to context structure D14 of the previous thread structure into the context pool D04, and initializes the pointer to context structure D14 of the previous thread structure to "NULL" (partial step S074).

Next, the context correlation cancellation/restoration unit 2032 sets, in the register of the CPU, the value of the general wait state context D33 of the context structure D50 pointed by the pointer D14 of the current thread structure (partial step S075), and ends the process of the context correlation cancellation/restoration step (partial step S076).

<Context Storage/Correlation Assigning Step>

Next, the context storage/correlation assigning step S080 called by the partial step S137 of the improved dispatch request step will be explained.

Figure 22:
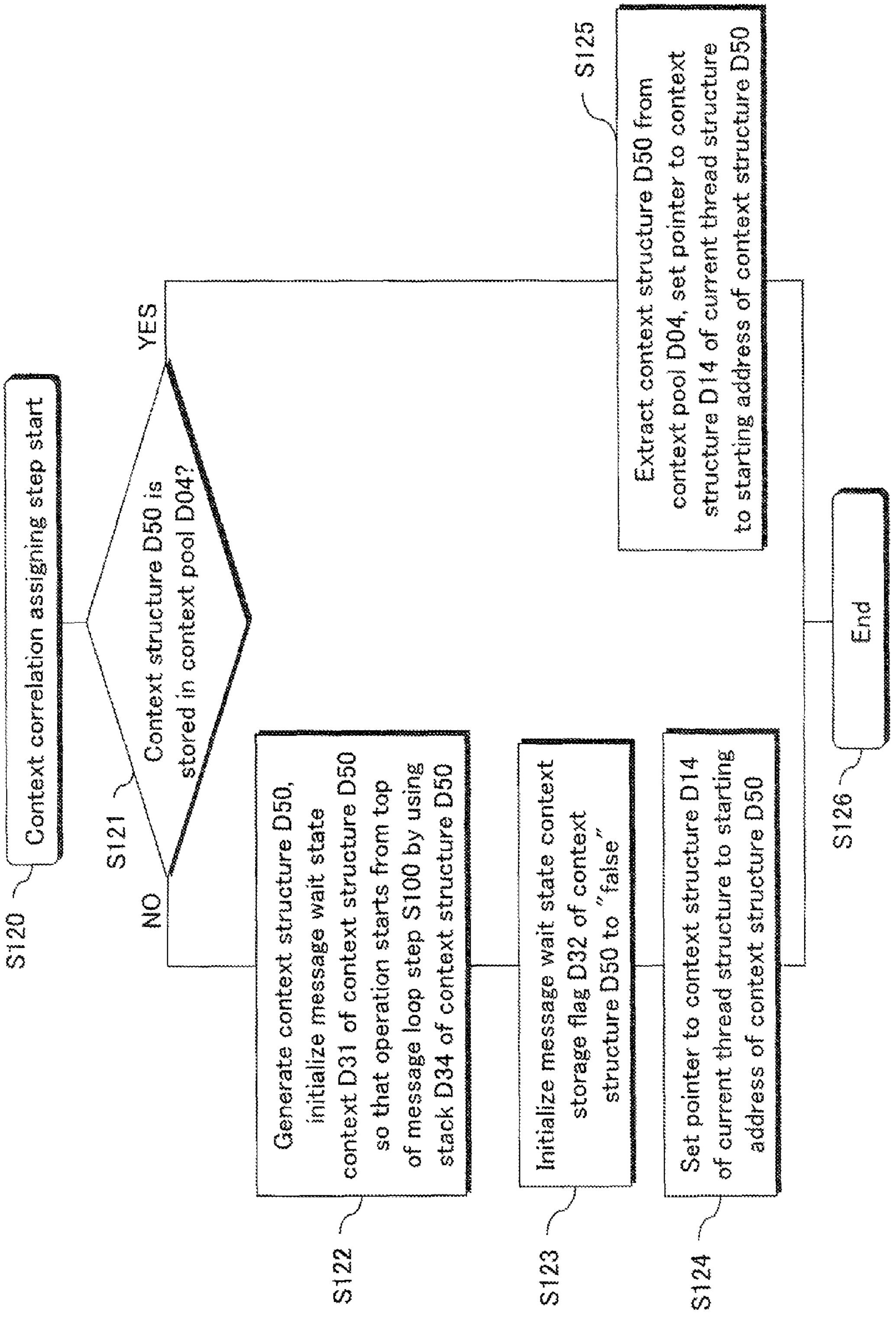
FIG. 22 is a flowchart showing the operation of the context storage/correlation assigning unit 2033 provided in the information processing device 2000.

FIGS. 21 and 22 are flowcharts showing the operation of the context storage/correlation assigning unit 2033 provided in the information processing device 2000.

The context storage/correlation assigning unit 2033 stores the value currently set in the register of the CPU into the general wait state context D33 of the context structure D50 pointed to by the pointer to context structure D14 of the previous thread structure. In so doing, the value stored in the PC is corrected to "S084" (partial step S081).

Next, the context storage/correlation assigning unit 2033 calls a context correlation assigning step S120 (partial step S082). The content of the context correlation assigning step S120 will be described later.

Next, the context storage/correlation assigning unit 2033 sets, in the register of the CPU, the value of the message wait state context D31 of the context structure D50 pointed to by the pointer to context structure D14 of the current thread structure (partial step S083), and ends the process of the context storage/correlation assigning step (partial step S084).

<Context Correlation Assigning Step>

Next, the context correlation assigning step S120 called by the partial step S082 of the context storage/correlation assigning step will be explained with reference to the flowchart shown in FIG. 22.

The context storage/correlation assigning unit 2033 judges whether or not the context structure D50 is stored in the context pool D04 (partial step S121). When it is judged that the context structure D50 is not stored in the context pool D04 (partial step S121:NO), the context storage/correlation assigning unit 2033 generates the context structure D50, initializes the PC of the message wait state context D31 to "S100", and initializes a stack pointer (also referred to as "SP") to the stack D34 of the generated context structure D50 (partial step S122).

Next, the context storage/correlation assigning unit 2033 initializes the message wait state context storage flag D32 of the generated context structure D50 to "false" (partial step S123), sets the pointer to context structure D14 of the current thread structure to the address of the generated context structure (partial step S124), and ends the context correlation assigning step (partial step S126).

When it is judged in the partial step S121 that the context structure D50 is stored in the context pool D04 (partial step S121:YES), the context storage/correlation assigning unit 2033 sets the pointer to context structure D14 of the current thread structure to the address of the context structure D50 extracted from the context pool D04 (partial step S125), and ends the context correlation assigning step (partial step S126).

<Specific Example>

Taking as an example the case where switching occurs among threads correlated with the thread structures D10A, D10B, and D10C, the operation of information processing device 2000 will be explained specifically.

In the following description, it is assumed that the pointer to current thread structure D02 is "D10C", and with regard to the thread structure D10A, the thread state D11 is "T2", the thread priority D12 is "lowest", the message queue D15 is "MES" (there is one message), and the pointer to context structure D14 is "D50A".

Also, it is assumed that, with regard to the thread structure D10B, the thread state D11 is "T2", the thread priority D12 is "middle", the message queue D15 is "MES", and the pointer to context structure D14 is "NULL".

It is further assumed that, with regard to the thread structure D10C, the thread state D11 is "T1", the thread priority D12 is "high", the message queue D15 is empty, and the pointer to context structure D14 is "D50B", and that the message wait state context storage flag D32 of the context structure D50B is "true".

Also, the description is based on the assumption that a thread correlated with the thread structure D10C is going to start the process of the partial step S101 in the message loop step S100 shown on the left-hand side of FIG. 8.

<First Switching>

The thread correlated with the thread structure D10C executes the partial steps S102 through S105 in a similar manner to the specific example in Embodiment 1 because there is no message in the message queue D15 of the thread structure D10C (partial step S101:NO). In the example of the present embodiment, the pointer to current thread structure D02 is updated to "D10B" in the partial step S104.

As the improved dispatch request step S130 is called and executed, the execution control unit 2020 judges that the pointer to current thread structure D02 (D10B) and the pointer to previous thread structure D03 (D10A) are not the same (partial step S131:NO), judges that the returned value of the message wait state transition detection step S010 is "true" (partial step S132:YES), and judges that the returned value of the context no-correlation detection step S050 is "true" (partial step S133:YES), and thus calls the context correlation moving step S060 (partial step S134).

In the context correlation moving step S060 performed upon receiving an instruction from the execution control unit 2020, the context correlation moving unit 2031 judges that the message wait state context storage flag D32 of the context structure (D50B) pointed to by the pointer to context structure D14 of the previous thread structure (D10C) is "true" (partial step S061:YES), sets the pointer to context structure D14 of the current thread structure (D10B) to "D50B" and sets the pointer to context structure D14 of the previous thread structure (D10C) to "NULL" (partial steps S064 and S065), and the process of the context correlation moving step (partial step S066).

Returning again to the improved dispatch request step, the execution control unit 2020 ends the process of the improved dispatch request step (partial step S139 shown in FIG. 17).

<Second Switching>

It is judged that a message is stored in the message queue D15 of the thread structure D10B (partial step S101 shown on the left-hand side of FIG. 8:YES), the thread correlated with the thread structure D10B performs the process of the message handler by using the extracted message as an argument (partial step S106). It is assumed here that, in this example, there is no switching between threads in the message handler.

Returning again to the partial step S101, it is judged that no message is stored in the message queue D15 of the thread structure D10B (partial step S101:NO), the thread correlated with the thread structure D10B performs the partial steps S102 through S105 as in the first switching. In this example, in the partial step S104, the pointer to current thread structure D02 is updated to "D10A".

In the improved dispatch request step S130 performed upon call, the execution control unit 2020 judges that the current thread structure (D10A) and the previous thread structure (D10B) are not the same (partial step S131 shown in FIG. 17:NO), judges that the returned value of the message wait state transition detection step S010 is "true" (partial step S132:YES), and judges that the returned value of the context no-correlation detection step S050 is "false" (partial step S133:NO), and thus calls the context correlation cancellation/restoration step S070 (partial step S135).

In the context correlation cancellation/restoration step S070 performed upon receiving an instruction from the execution control unit 2020, the context correlation cancellation/restoration unit 2032 judges that the message wait state context storage flag D32 of the context structure (D50B) pointed to by the pointer to context structure D14 of the previous thread structure (D10B) is "true" (partial step S071: YES), thus stores the context structure (D50B) pointed to by the pointer to context structure D14 of the previous thread structure (D10B) into the context pool D04, and initializes the pointer to context structure D14 of the previous thread structure to "NULL" (partial step S074).

Next, the context correlation cancellation/restoration unit 2032 sets, in the register of the CPU, the value of the general wait state context D33 of the context structure (D50A) pointed by the pointer D14 of the current thread structure (D10A) (partial step S075), and ends the process of the context correlation cancellation/restoration step (partial step S076).

Returning again to the improved dispatch request step, the execution control unit 2020 ends the process of the improved dispatch request step (partial step S139 shown in FIG. 17).

In the above example, the context correlation moving step S060 and the context correlation cancellation/restoration step S070 are called in the improved dispatch request step S130 and threads are switched. With this structure, threads are switched at a high speed compared with the case where the dispatch step S040 is always called.

<Supplementary Notes>

Up to now, the information processing device of the present invention has been described based on the embodiments thereof. However, the present invention is not limited to the information processing devices disclosed in the above embodiments, but may be modified, for example, as follows.

(1) According to examples shown in the above embodiments, one processor is used to switch between a plurality of threads for parallel executions. However, a plurality of processors may be used to switch between a plurality of threads for parallel executions. In that case, threads may be assigned to processors as explained in each of the embodiments.

(2) According to the above embodiments, a programming code correlated with the main loop step is shared by the threads, and each of the threads executes the code. However, a plurality of codes having the same processing construction may be prepared in one-to-one correspondence with the threads, and each thread may execute a corresponding code. In that case, a current thread to be executed needs to send a location in the memory of a code corresponding to the thread itself to the information processing device of the present invention. This can be realized, for example, by causing the thread structure correlated with the thread to include a base address value of a location in the memory where the code corresponding to the thread itself is stored.

(3) The scheduling unit of the present invention corresponds to the schedule unit 1020 recited in each embodiment. The first detection unit of the present invention corresponds to the transition detecting unit 1030 recited in each embodiment. The second detection unit of the present invention corresponds to the wakeup detecting unit 1040 in Embodiment 1 and the context no-correlation detecting unit 2010 in Embodiment 2. The context storage unit and the initial context storage unit of the present invention correspond to the storage unit 1010 in each embodiment. The context correlation unit and the setting unit of the present invention correspond to the execution control unit, the correlation unit, and the dispatch unit 1060 in each embodiment.

INDUSTRIAL APPLICABILITY

The information processing device of the present invention can be used in the multi-thread execution control.

REFERENCE SIGNS LIST

| | |
|---|---|
| 1000, 2000 | information processing device |
| 1010 | storage unit |
| 1020 | schedule unit |
| 1030 | transition detecting unit |
| 1040 | wakeup detecting unit |
| 1050, 2020 | execution control unit |
| 1060 | dispatch unit |
| 1070, 2030 | correlation unit |
| 1071 | context correlation exchanging unit |
| 2010 | context no-correlation detecting unit |
| 2031 | context correlation moving unit |
| 2032 | context correlation cancellation/restoration unit |
| 2033 | context storage/correlation assigning unit |

The invention claimed is:

1. An information processing device for causing a processor to execute a plurality of threads by switching therebetween, each of the threads performing a process in correspondence with an obtainment of an event, the information processing device comprising:

a storage unit storing a plurality of contexts in correlation with the plurality of threads;

a scheduling unit causing a first thread among the plurality of threads to transit from an execution state to a non-execution state, selecting a second thread to be executed next from among the plurality of threads, and causing the second thread to transit to the execution state;

a first detection unit, when the first thread is caused to transit to the non-execution state, detecting whether or not a next processing start position, of the first thread when the first thread transits back to the execution state a next time, belongs to a processed part that has already been processed in correspondence with the obtainment of the event;

a context correlation unit (i) storing into the storage unit a context that has been set in the processor, the context being correlated with the first thread, and the context being stored when the first detection unit detects that the next start position does not belong to the processed part, and (ii) not storing into the storage unit the context correlated with the first thread when the first detection unit detects that the next start position belongs to the processed part;

a second detection unit, when the second thread is caused to transit to the execution sate, detecting whether or not a processing start position of the second thread belongs to the processed part; and a setting unit (i) not setting in the processor a context correlated with the second thread when the first detection unit detects that the next start position belongs to the processed part and the second detection unit detects that the processing start position of the second thread belongs to the processed part, and (ii) setting in the processor the context correlated with the second thread when the second detection unit detects that the processing start position of the second thread does not belong to the processed part, wherein when, during the setting of the context correlated with the second thread of the processor, the setting unit detects that the context correlated with the second thread is not stored in the storage unit, the setting unit sets an initial context in the processor to specify the processed part as the processing start position.

2. The information processing device of claim 1, wherein:

when the second detection unit detects that the processing start position belongs to the processed part and the first detection unit detects that the next starts position belongs to the processed part, the context correlation unit changes in correlation the context that has been correlated with the first thread, as being correlated with the second thread.

3. The information processing device of claim 1, wherein when the second detection unit detects that the processing start position belongs to the processed part and the first detection unit detects that the next start position belongs to the processed part, the context correlation unit changes in correlation the context that has been correlated with the second thread, as being correlated with the first thread, and changes in correlation the context that has been correlated with the first thread, as being correlated with the second thread.

4. The information processing device of claim 3, wherein the event is a message, the non-execution state includes a message wait state in which a reception of the message is waited for, the plurality of threads includes a thread in which a flag is set to indicate that the thread transits to the message wait state when the next start position belongs to the processed part, and the first detection unit and the second detection unit detect whether or not the next processing start position in the first thread and the processing start position in the second thread belong to the processed part, by detecting whether or not the flag is set in the first thread and the second thread, respectively.

5. An information processing method for use in an information processing device for causing a processor to execute a plurality of threads by switching therebetween, each of the threads performing a process in correspondence with an obtainment of an event, the information processing method comprising:

a step of storing, in a storage unit, a plurality of contexts in correlation with the plurality of threads;

a step of causing a scheduling unit to transit a first thread among the plurality of threads from an execution state to a non-execution state, selecting a second thread to be executed next from among the plurality of threads, and causing the scheduling unit to transit the second thread to the execution state;

a first detecting step of detecting, via a first detection unit and when the first thread is caused to transit to the non-execution state, whether or not a next processing start position, of the first thread when the first thread transits back to the execution state a next time, belongs to a processed part that has already been processed in correspondence with the obtainment of the event;

a context correlation step of (i) storing into the storage unit a context that has been set in the processor, the context being correlated with the first thread, and the context being stored when the first detecting step detects that the next start position does not belong to the processed part, and (ii) not storing into the storage unit the context correlated with the first thread when the first detecting step detects that the next start position belongs to the processed part;

a second detecting step of detecting, via a second detection unit and when the second thread is caused to transit to the execution state, whether or not a processing start position, of the second thread belongs to the processed part; and a setting step of (i) not setting in the processor a context correlated with the second thread when the first detecting step detects that the next start position belongs to the processed part and the second detecting step detects that the processing start position of the second thread belongs to the processed part, and (ii) setting in the processor the context correlated with the second thread when the second detecting step detects that the processing start position of the second thread does not belong to the processed part, wherein when, during the setting of the context correlated with the second thread of the processor, the setting step detects that the context correlated with the second thread is not stored in the storage unit, the setting step sets an initial context in the processor to specify the processed part as the processing start position.

6. A non-transitory computer-readable recording medium having an information processing program recorded thereon, the information processing program causing an information processing device including a computer, which causes a processor to execute a plurality of threads by switching therebetween, to execute a thread execution method, each of the threads performing a process in correspondence with an obtainment of an event, the thread execution control method comprising:

a step of storing, in a storage unit, a plurality of contexts in correlation with the plurality of threads;

a step of causing a first thread among the plurality of threads to transit from an execution state to a non-execution state, selecting a second thread to be executed next from among the plurality of threads, and causing the second thread to transit to the execution state;

a first detecting step of, when the first thread is caused to transit to the non-execution state, detecting whether or not a next processing start position, of the first thread when the first thread transits back to the execution state a next time, belongs to a processed part that has already been processed in correspondence with the obtainment of the event;

a context correlation step of (i) storing into the storage unit a context that has been set in the processor, the context being correlated with the first thread, and the context being stored when the first detecting step detects that the next start position does not belong to the processed part, and (ii) not storing into the storage unit the context correlated with the first thread when the first detecting step detects that the next start position belongs to the processed part;

a second detecting step of, when the second thread is caused to transit to the execution state, detecting whether or not a processing start position, of the second thread belongs to the processed part; and a setting step of (i) not setting in the processor a context correlated with the second thread when the first detecting step detects that the next start position belongs to the processed part and the second detecting step detects that the processing start position of the second thread belongs to the processed part, and (ii) setting in the processor the context correlated with the second thread when the second detecting step detects that the processing start position of the second thread does not belong to the processed part, wherein when, during the setting of the context correlated with the second thread of the processor, the setting step detects that the context correlated with the second thread is not stored in the storage unit, the setting step sets an initial context in the processor to specify the processed part as the processing start position.

* * * * *